US007040286B2

(12) United States Patent  
Campbell

(10) Patent No.: US 7,040,286 B2  
(45) Date of Patent: May 9, 2006

(54) ENGINE CONTROL SYSTEM AND METHOD

(76) Inventor: Scott G. Campbell, 2480 NE. 102 Ave., Ankeny, IA (US) 50021

( * ) Notice: Subject to any disclaimer, the term of this patent is extended or adjusted under 35 U.S.C. 154(b) by 0 days.

(21) Appl. No.: 10/863,109

(22) Filed: Jun. 8, 2004

(65) Prior Publication Data

US 2005/0268887 A1 Dec. 8, 2005

(51) Int. Cl.  
*F02P 5/00* (2006.01)
(52) U.S. Cl. .................. 123/406.6; 123/406.58
(58) Field of Classification Search .......... 123/406.19, 123/406.23, 406.24, 406.35, 406.58, 406.59, 123/406.6, 406.61, 406.62, 406.63, 406.64, 123/406.65, 612, 613, 636, 638  
See application file for complete search history.

(56) References Cited

U.S. PATENT DOCUMENTS 3,738,339 A * 6/1973 Huntzinger et al. ... 123/406.63
3,955,723 A * 5/1976 Richards ................. 123/406.63
4,649,881 A * 3/1987 Long ...................... 123/406.63
4,700,305 A * 10/1987 Lotterbach et al. ......... 701/101
4,951,629 A    8/1990 McAbee et al.
5,074,262 A   12/1991 McAbee et al.
5,513,612 A    5/1996 McAbee et al.
6,208,131 B1 * 3/2001 Cebis et al. ................ 324/165
6,560,528 B1 * 5/2003 Gitlin et al. ................ 701/115

* cited by examiner

*Primary Examiner*—Mahmoud Gimie  
(74) *Attorney, Agent, or Firm*—McKee, Voorhees & Sease, P.L.C.

(57) ABSTRACT

An engine control system for an internal combustion engine and a method of programming is provided. The engine control system has a rotation sensing system, an intelligent controller connected to the rotation sensing system for calculating at least one of a cylinder position or an engine RPM, and an engine controlling output created by the intelligent controller in response to at least one of the cylinder position or the engine RPM. The method of programming including the steps determining engine parameters and selecting an engine controlling output in response to at least one of the cylinder positions or the engine RPM.

35 Claims, 21 Drawing Sheets

| Graph Y-axis | 1, 2 Cyl & HD | 4 Cyl | 3 & 6 Cyl | 8 Cyl |
|---|---|---|---|---|
| 240° | 0 | 1 | 2 | 2 |
| 230° | 0 | 1 | 1 | 2 |
| 220° | 0 | 1 | 1 | 2 |
| 210° | 0 | 1 | 1 | 2 |
| 200° | 0 | 1 | 1 | 2 |
| 190° | 0 | 1 | 1 | 2 |
| 180° | 0 | 1 | 1 | 2 |
| 170° | 0 | 0 | 1 | 1 |
| 160° | 0 | 0 | 1 | 1 |
| 150° | 0 | 0 | 1 | 1 |
| 140° | 0 | 0 | 1 | 1 |
| 130° | 0 | 0 | 1 | 1 |
| 120° | 0 | 0 | 1 | 1 |
| 110° | 0 | 0 | 0 | 1* |
| 100° | 0 | 0 | 0 | 1 |
| 90° | 0 | 0 | 0 | 1 |
| 80° | 0 | 0 | 0 | 0 |
| 70° | 0 | 0 | 0 | 0 |
| 60° | 0 | 0 | 0 | 0 |
| 50° | 0 | 0 | 0 | 0 |
| 40° | 0 | 0 | 0 | 0 |
| 30° | 0 | 0 | 0 | 0 |
| 20° | 0 | 0 | 0 | 0 |
| 10° | 0 | 0 | 0 | 0 |

FIG. 10

| Graph Y-axis | 2 Cyl Cam | HD Cam | 4 Cyl Cam | 6 Cyl Cam | 8 Cyl Cam |
|---|---|---|---|---|---|
| 240° | 1 | 1 | 111 | 111 | 21 |
| 230° | 10 | 11 | 121 | 1 | 31 |
| 220° | 20 | 21 | 131 | 11 | 41 |
| 210° | 30 | 31 | 141 | 21 | 51 |
| 200° | 40 | 41 | 151 | 31 | 61 |
| 190° | 50 | 51 | 161 | 41 | 71 |
| 180° | 60 | 61 | 171 | 51 | 81 |
| 170° | 70 | 71 | 1 | 61 | 1 |
| 160° | 80 | 81 | 11 | 71 | 11 |
| 150° | 90 | 91 | 21 | 81 | 21 |
| 140° | 100 | 101 | 31 | 91 | 31 |
| 130° | 110 | 111 | 41 | 101 | 41 |
| 120° | 120 | 121 | 51 | 111 | 51 |
| 110° | 130 | 131 | 61 | 1 | 61 |
| 100° | 140 | 141 | 71 | 11 | 71 |
| 90° | 150 | 151 | 81 | 21 | 81 |
| 80° | 160 | 161 | 91 | 31 | 1 |
| 70° | 170 | 171 | 101 | 41 | 11 |
| 60° | 180 | 181 | 111 | 51 | 21 |
| 50° | 190 | 191 | 121 | 61 | 31 |
| 40° | 200 | 201 | 131 | 71 | 41 |
| 30° | 210 | 211 | 141 | 81 | 51 |
| 20° | 220 | 221 | 151 | 91 | 61 |
| 10° | 230 | 231 | 161 | 101 | 71 |

*FIG. 11*

| Graph Y-axis | 1 & 2 Cyl Crank | 4 Cyl Crank | 3 & 6 Cyl Crank | 8 Cyl Crank |
|---|---|---|---|---|
| 240° | 7 | 111 | 111 | 21 |
| 230° | 17 | 121 | 1 | 31 |
| 220° | 27 | 131 | 11 | 41 |
| 210° | 37 | 141 | 21 | 51 |
| 200° | 47 | 151 | 31 | 61 |
| 190° | 57 | 161 | 41 | 71 |
| 180° | 67 | 171 | 51 | 81 |
| 170° | 77 | 1 | 61 | 1 |
| 160° | 87 | 11 | 71 | 11 |
| 150° | 97 | 21 | 81 | 21 |
| 140° | 107 | 31 | 91 | 31 |
| 130° | 117 | 41 | 101 | 41 |
| 120° | 127 | 51 | 111 | 51 |
| 110° | 137 | 61 | 1 | 61* |
| 100° | 147 | 71 | 11 | 71 |
| 90° | 157 | 81 | 21 | 81 |
| 80° | 167 | 91 | 31 | 1 |
| 70° | 177 | 101 | 41 | 11 |
| 60° | 187 | 111 | 51 | 21 |
| 50° | 197 | 121 | 61 | 31 |
| 40° | 207 | 131 | 71 | 41 |
| 30° | 217 | 141 | 81 | 51 |
| 20° | 227 | 151 | 91 | 61 |
| 10° | 237 | 161 | 101 | 71 |

FIG. 12

| Graph Y-axis | 2 Cyl Cam | HD Cam | 4 Cyl Cam | 6 Cyl Cam | 8 Cyl Cam |
|---|---|---|---|---|---|
| 75° | 165 | 166 | 94 | 34 | 4 |
| 74° | 166 | 167 | 95 | 35 | 5 |
| 73° | 167 | 168 | 96 | 36 | 6 |
| 72° | 168 | 169 | 97 | 37 | 7 |
| 71° | 169 | 170 | 98 | 38 | 8 |
| 70° | 170 | 171 | 99 | 39 | 9 |
| 69° | 171 | 172 | 100 | 40 | 10 |
| 68° | 172 | 173 | 101 | 41 | 11 |
| 67° | 173 | 174 | 102 | 42 | 12 |
| 66° | 174 | 175 | 103 | 43 | 13 |
| 65° | 175 | 176 | 104 | 44 | 14 |
| 64° | 176 | 177 | 105 | 45 | 15 |
| 63° | 177 | 178 | 106 | 46 | 16 |
| 62° | 178 | 179 | 107 | 47 | 17 |
| 61° | 179 | 180 | 108 | 48 | 18 |
| 60° | 180 | 181 | 109 | 49 | 19 |
| 59° | 181 | 182 | 110 | 50 | 20 |
| 58° | 182 | 183 | 111 | 51 | 21 |
| 57° | 183 | 184 | 112 | 52 | 22 |
| 56° | 184 | 185 | 113 | 53 | 23 |
| 55° | 185 | 186 | 114 | 54 | 24 |
| 54° | 186 | 187 | 115 | 55 | 25 |
| 53° | 187 | 188 | 116 | 56 | 26 |
| 52° | 188 | 189 | 117 | 57 | 27 |
| 51° | 189 | 190 | 118 | 58 | 28 |
| 50° | 190 | 191 | 119 | 59 | 29 |
| 49° | 191 | 192 | 120 | 60 | 30 |
| 48° | 192 | 193 | 121 | 61 | 31 |
| 47° | 193 | 194 | 122 | 62 | 32 |
| 46° | 194 | 195 | 123 | 63 | 33 |
| 45° | 195 | 196 | 124 | 64 | 34 |
| 44° | 196 | 197 | 125 | 65 | 35 |
| 43° | 197 | 198 | 126 | 66 | 36 |
| 42° | 198 | 199 | 127 | 67 | 37 |
| 41° | 199 | 200 | 128 | 68 | 38 |
| 40° | 200 | 201 | 129 | 69 | 39 |

FIG. 13

| Graph Y-axis | 2 Cyl Cam | HD Cam | 4 Cyl Cam | 6 Cyl Cam | 8 Cyl Cam |
|---|---|---|---|---|---|
| 39° | 201 | 202 | 130 | 70 | 40 |
| 38° | 202 | 203 | 131 | 71 | 41 |
| 37° | 203 | 204 | 132 | 72 | 42 |
| 36° | 204 | 205 | 133 | 73 | 43 |
| 35° | 205 | 206 | 134 | 74 | 44 |
| 34° | 206 | 207 | 135 | 75 | 45 |
| 33° | 207 | 208 | 136 | 76 | 46 |
| 32° | 208 | 209 | 137 | 77 | 47 |
| 31° | 209 | 210 | 138 | 78 | 48 |
| 30° | 210 | 211 | 139 | 79 | 49 |
| 29° | 211 | 212 | 140 | 80 | 50 |
| 28° | 212 | 213 | 141 | 81 | 51 |
| 27° | 213 | 214 | 142 | 82 | 52 |
| 26° | 214 | 215 | 143 | 83 | 53 |
| 25° | 215 | 216 | 144 | 84 | 54 |
| 24° | 216 | 217 | 145 | 85 | 55 |
| 23° | 217 | 218 | 146 | 86 | 56 |
| 22° | 218 | 219 | 147 | 87 | 57 |
| 21° | 219 | 220 | 148 | 88 | 58 |
| 20° | 220 | 221 | 149 | 89 | 59 |
| 19° | 221 | 222 | 150 | 90 | 60 |
| 18° | 222 | 223 | 151 | 91 | 61 |
| 17° | 223 | 224 | 152 | 92 | 62 |
| 16° | 224 | 225 | 153 | 93 | 63 |
| 15° | 225 | 226 | 154 | 94 | 64 |
| 14° | 226 | 227 | 155 | 95 | 65 |
| 13° | 227 | 228 | 156 | 96 | 66 |
| 12° | 228 | 229 | 157 | 97 | 67 |
| 11° | 229 | 230 | 158 | 98 | 68 |
| 10° | 230 | 231 | 159 | 99 | 69 |
| 9° | 231 | 232 | 160 | 100 | 70 |
| 8° | 232 | 233 | 161 | 101 | 71 |
| 7° | 233 | 234 | 162 | 102 | 72 |
| 6° | 234 | 235 | 163 | 103 | 73 |
| 5° | 235 | 236 | 164 | 104 | 74 |
| 4° | 236 | 237 | 165 | 105 | 75 |
| 3° | 237 | 238 | 166 | 106 | 76 |
| 2° | 238 | 239 | 167 | 107 | 77 |
| 1° | 239 | 240 | 168 | 108 | 78 |

*FIG. 13 (Continued)*

| Graph Y-axis | 1 & 2 Cyl Crank | 4 Cyl Crank | 3 & 6 Cyl Crank | 8 Cyl Crank |
|---|---|---|---|---|
| 75° | 172 | 96 | 36 | 6 |
| 74° | 173 | 97 | 37 | 7 |
| 73° | 174 | 98 | 38 | 8 |
| 72° | 175 | 99 | 39 | 9 |
| 71° | 176 | 100 | 40 | 10 |
| 70° | 177 | 101 | 41 | 11 |
| 69° | 178 | 102 | 42 | 12 |
| 68° | 179 | 103 | 43 | 13 |
| 67° | 180 | 104 | 44 | 14 |
| 66° | 181 | 105 | 45 | 15 |
| 65° | 182 | 106 | 46 | 16 |
| 64° | 183 | 107 | 47 | 17 |
| 63° | 184 | 108 | 48 | 18 |
| 62° | 185 | 109 | 49 | 19 |
| 61° | 186 | 110 | 50 | 20 |
| 60° | 187 | 111 | 51 | 21 |
| 59° | 188 | 112 | 52 | 22 |
| 58° | 189 | 113 | 53 | 23 |
| 57° | 190 | 114 | 54 | 24 |
| 56° | 191 | 115 | 55 | 25 |
| 55° | 192 | 116 | 56 | 26 |
| 54° | 193 | 117 | 57 | 27 |
| 53° | 194 | 118 | 58 | 28 |
| 52° | 195 | 119 | 59 | 29 |
| 51° | 196 | 120 | 60 | 30 |
| 50° | 197 | 121 | 61 | 31 |
| 49° | 198 | 122 | 62 | 32 |
| 48° | 199 | 123 | 63 | 33 |
| 47° | 200 | 124 | 64 | 34 |
| 46° | 201 | 125 | 65 | 35 |
| 45° | 202 | 126 | 66 | 36 |
| 44° | 203 | 127 | 67 | 37 |
| 43° | 204 | 128 | 68 | 38 |
| 42° | 205 | 129 | 69 | 39* |
| 41° | 206 | 130 | 70 | 40 |
| 40° | 207 | 131 | 71 | 41 |

FIG. 14

| Graph Y-axis | 1 & 2 Cyl Crank | 4 Cyl Crank | 3 & 6 Cyl Crank | 8 Cyl Crank |
|---|---|---|---|---|
| 39° | 208 | 132 | 72 | 42 |
| 38° | 209 | 133 | 73 | 43 |
| 37° | 210 | 134 | 74 | 44 |
| 36° | 211 | 135 | 75 | 45 |
| 35° | 212 | 136 | 76 | 46 |
| 34° | 213 | 137 | 77 | 47 |
| 33° | 214 | 138 | 78 | 48 |
| 32° | 215 | 139 | 79 | 49* |
| 31° | 216 | 140 | 80 | 50 |
| 30° | 217 | 141 | 81 | 51 |
| 29° | 218 | 142 | 82 | 52 |
| 28° | 219 | 143 | 83 | 53 |
| 27° | 220 | 144 | 84 | 54 |
| 26° | 221 | 145 | 85 | 55 |
| 25° | 222 | 146 | 86 | 56 |
| 24° | 223 | 147 | 87 | 57 |
| 23° | 224 | 148 | 88 | 58 |
| 22° | 225 | 149 | 89 | 59 |
| 21° | 226 | 150 | 90 | 60 |
| 20° | 227 | 151 | 91 | 61 |
| 19° | 228 | 152 | 92 | 62 |
| 18° | 229 | 153 | 93 | 63 |
| 17° | 230 | 154 | 94 | 64 |
| 16° | 231 | 155 | 95 | 65 |
| 15° | 232 | 156 | 96 | 66 |
| 14° | 233 | 157 | 97 | 67 |
| 13° | 234 | 158 | 98 | 68 |
| 12° | 235 | 159 | 99 | 69 |
| 11° | 236 | 160 | 100 | 70 |
| 10° | 237 | 161 | 101 | 71 |
| 9° | 238 | 162 | 102 | 72 |
| 8° | 239 | 163 | 103 | 73 |
| 7° | 240 | 164 | 104 | 74 |
| 6° | 241 | 165 | 105 | 75 |
| 5° | 242 | 166 | 106 | 76 |
| 4° | 243 | 167 | 107 | 77 |
| 3° | 244 | 168 | 108 | 78 |
| 2° | 245 | 169 | 109 | 79 |
| 1° | 246 | 170 | 110 | 80 |
| 0° | 247 | 171 | 111 | 81 |

FIG. 14 (Continued)

ENGINE CONTROL SYSTEM AND METHOD

BACKGROUND OF THE INVENTION

This invention relates to engine control systems and a method of programming engine control systems.

One important engine control system is a multiple combustion ignition system for internal combustion engines.

Currently known fuel delivery systems deliver, atomized gas vapor to the cylinder of the engine in such a manner that a single spark from an ignition system often does not completely burn all of the fuel. This is particularly true when the engine is cold or when excess fuel has been delivered to the cylinder due to imperfect fuel delivery systems, sudden acceleration, etc. Once the primary explosion occurs due to the initial spark, the air/gas mixture begins combusting near the spark plug and then spreads throughout the cylinder creating a flame front. Presently known fuel delivery systems do not provide a perfect air/gas mixture in the cylinder, and this imperfect mixture results in uneven burning as the flame front moves throughout the cylinder. As a result some of the air/gas mixture often remains unburned.

Some prior art ignition systems have attempted to deal with this problem by firing a string of uncontrolled sparks in rapid progression during the power stroke of the combustion cycle. This generally does not achieve a fully satisfactory complete combustion of fuel, and also causes excessive spark plug wear.

Other prior art ignition systems have attempted to utilize a multiple ignition system which is based on the timing of the secondary explosions relative to the first explosion. The second explosion and later explosions are based upon the time lapse after the first explosion. This type of timed multiple explosion system is inadequate and is unstable because the second and later explosions will not always occur at the same position of the piston from cycle to cycle. Over a period of several cycles of the engine, the RPM's of the engine are often inconsistent, and the secondary explosions will occur at times corresponding to different positions of the piston within the cylinder.

The effectiveness of a secondary or later explosion depends upon creating that secondary explosion precisely at the desired position of the piston in the cylinder. Such precision is not achieved when the secondary explosion is caused to occur a predetermined time after the first explosion. If the control system is not highly stable and precise the secondary explosion cannot be consistently implemented, then the advantages of having multiple sparks are significantly reduced.

U.S. Pat. No. 5,513,612 issued to McAbee and Campbell teaches a multiple combustion ignition timing system that fires a second explosion relative to a predetermined position of the piston, rather than relative to the amount of time lapse after the first explosion as in the prior art. The '612 patent teaches utilizing a sensor connected to either the cam shaft or the crankshaft for sensing degree positions of the piston and for creating a plurality of trigger signals, each of which correspond to one of the piston's degree positions and leads to at least two sparks to each engine cylinder. While effective, this patent details the method and system of an ignition system that must be specifically designed for each different type of motor it is used for. This system does not have generic components and programmable pieces which are highly configurable for numerous engine control systems.

The prior art development of new ignition timing systems is expensive due to three primary reasons: 1) development costs are high and take time, 2) new circuit development for each ignition costs money and takes time, and 3) ignition curve development for a specific engine is time consuming and expensive.

Therefore, a primary object of the present invention is the provision of an improved engine control system and method for operating same.

A further object of the present invention is a generic mold which can stay the same, circuitry that is standardized and customizable for engine curve development with a user-friendly programming interface.

A further object of the present invention is an engine control system and method that is highly configurable for a variety of different engine types, including: one to multiple cylinders, distributor or distributor less two cycle or four cycle, cylinders that are not regularly offset as in a Harley-Davidson motorcycle with a 45° cylinder offset, etc.

A further object of the present invention is the provision of an improved engine control system and method which causes the sparks to be precisely synchronized with programmed positions of the piston within the cylinder.

A further object of the present invention is the provision of an engine control system that has a rotation sensing system which can be mounted either clockwise or counter clockwise on a rotating member of the engine (cam shaft, crankshaft, rotating plate, etc.).

A further object of the present invention is the provision of a sealed enclosure housing protecting the components of the rotation sensing system including a rotor and optical pickup device such that they may be placed in dirty environments.

A further object of the present invention is the provision of an engine control system which permits the stepping of the spark advances according to programmed RPM levels.

A further object of the present invention is the provision of an engine control system and method that has programmed fall back RPM that eliminates jittering when decelerating through a curve transition point.

A further object of the present invention is the provision of an engine control system which permits the independent adjustment of the spark advance at each of the different RPM levels.

A further object of the present invention is the provision of an engine control system which permits programming of the on/off ratios for the coil so as to minimize coil heating.

A further object of the present invention is the provision of an engine control system which has the ability of utilizing input sensors to select programmed RPM control curves.

A further object of the present invention is the provision of a highly stable ignition timing based upon the actual cylinder position rather than upon the passage of time after the first spark.

A further object of the present invention is the provision of an engine control system that permits control of systems, such as nitrous oxide feed, transmission shifting, transmission shift lights, fuel injection systems, charging systems, vehicle lighting systems, etc.

A further object of the present invention is the provision of an engine control system which utilizes an optical sensor which is highly stable.

A further object of the present invention is the provision of an engine control system which is economical to manufacture, durable in use, and efficient in operation.

SUMMARY OF THE INVENTION

The foregoing objectives may be achieved by an engine control system for an internal combustion engine. The internal combustion engine has a cylinder, a piston mounted within the cylinder, a cam shaft and a crank shaft connected to the pistons. The engine control system includes a rotation sensing system adjacent either the cam shaft or the crank shaft for creating a piston top dead center signal and count signal, in response to rotational movement to either the cam shaft or the crank shaft. The system also has an intelligent controller connected to the rotation sensing system calculating a cylinder position in an engine RPM based upon the pistons top dead center signal and the count signals. The system has an engine controlling output created by the intelligent controller in response to at least one of the cylinder positions or the engine RPM.

According to another feature of the present invention the rotation sensing system has a rotor with a plurality of counting slots around its circumference passing through a sensor to produce the count signals.

According to another feature of the present invention the rotation sensing system is housed within a sealed enclosure adapted for dirty environments. The rotation sensing system adapted to be mounted upon a cam shaft, a crank shaft, or a rotating mount plate.

According to another feature of the present invention the intelligent controller produces the engine controlling output after comparison to program parameters stored in memory.

The foregoing objectives may also be achieved by a method of programming an engine control system that includes the steps determining engine parameters, selecting a number of sparks to be utilized for the cylinders, and adjusting a firing time of the sparks depending upon an engine RPM.

According to another feature of the present invention the engine parameters considered include the engine cycle, the spark distribution for the engine, the mounting of the rotation sensing system, and the number of engine cylinders.

According to another feature of the present invention the method of programming an engine control system includes the step of selecting a number of transitions for the sparks.

According to another feature of the present invention the method includes the step of selecting an RPM lag value for the spark transitions.

According to another feature of the present invention the method includes the step of selecting a number of sensors compacting the firing time of the spark such as engine temperature and engine pressure.

According to another feature of the present invention the method of programming includes the step setting a revolutions per minute limit for the engine.

According to another feature of the present invention the engine control system includes the step of selecting a switch dependent upon the engine RPM which permits control of auxiliary systems such as nitrous oxide systems, shift lights, etc.

BRIEF DESCRIPTION OF THE DRAWINGS

FIG. 10 is a table of look-up values for the initial saturated cylinder with cells selected relevant to the example of FIG. 9.

FIG. 11 is a table of look-up values for initial saturation in degrees after the top dead center (TDC) slot for cam mounted rotor.

FIG. 12 is a table of look-up values for the initial coil on in degrees after the TDC slot with cells selected relevant to the example of FIG. 9.

FIG. 13 is a look-up table of values for initial spark in degrees after the TDC slot for a cam mounted rotor.

FIG. 14 is a table of look-up values for initial spark in degrees after the TDC slot with cells selected relevant to the example of FIG. 9.

DETAILED DESCRIPTION OF THE PREFERRED EMBODIMENT

Figure 1:
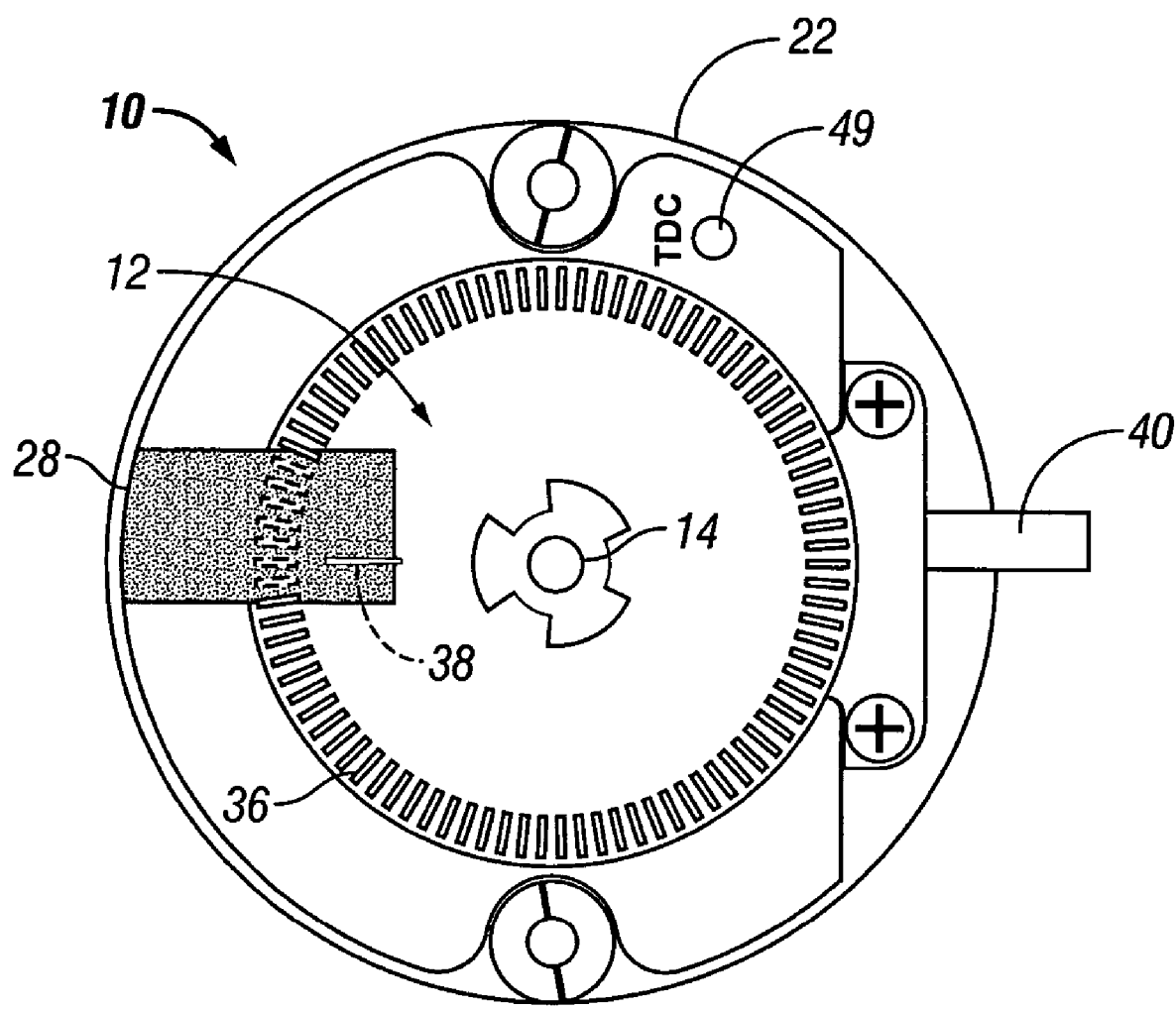
FIG. 1 is a top view of a rotation sensing system with the inside wheel exposed.

Referring to the drawings, the numeral 10 of FIGS. 1, 2A–B, and 3A–E refers to a rotation sensing system for sensing the rotational position of the engine cylinder during the power stroke of the engine. The rotation sensing system 10 includes a wheel 12 which is fixed to a rotor shaft 14. The rotor shaft 14 may be drivingly connected to either the cam shaft or crankshaft of the engine. The cam shaft rotates at one-half the RPMs of the crankshaft.

Figure 2A:
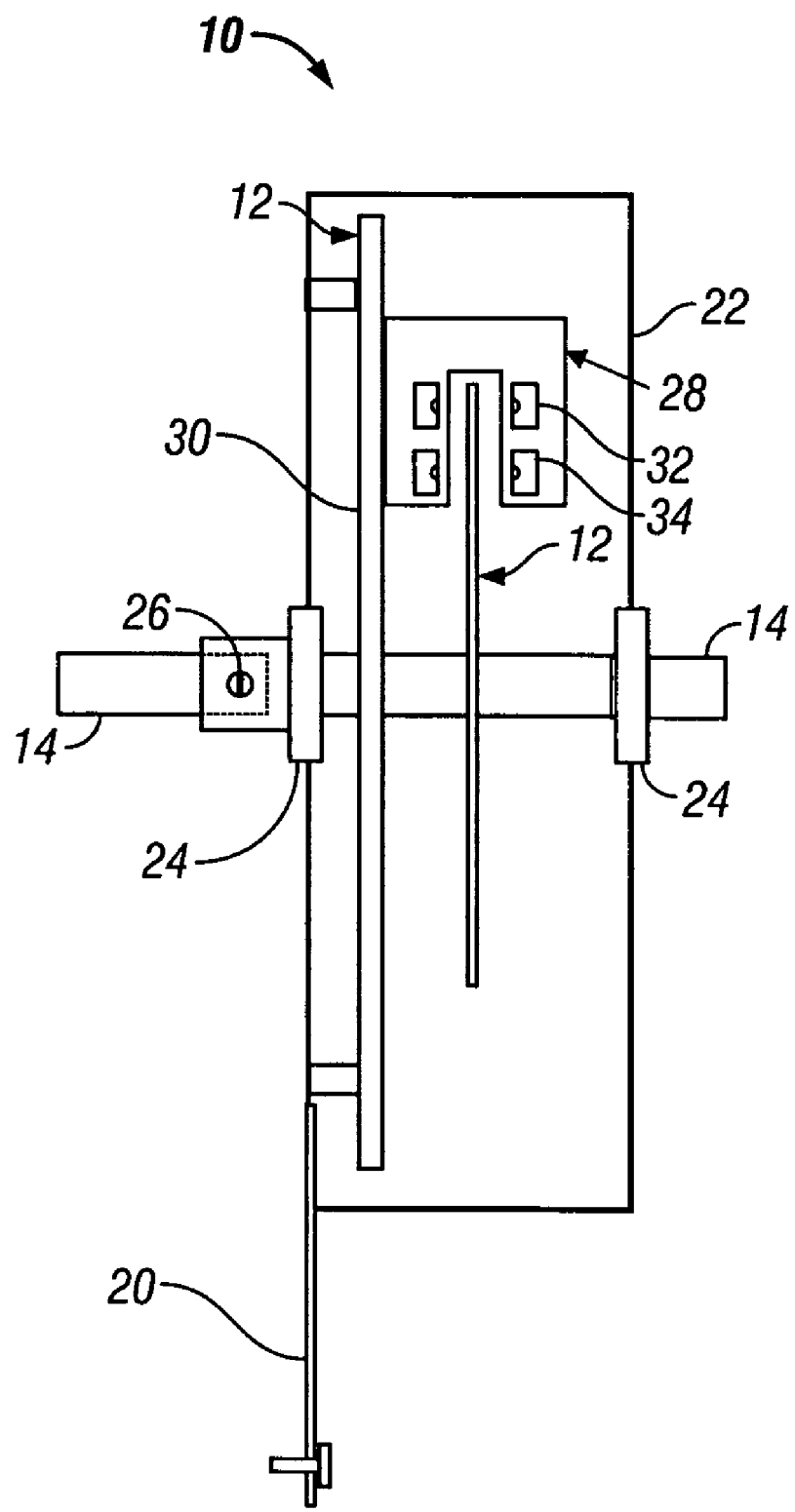
FIG. 2A is a side view of the rotation sensing system attached to a shaft and covered by a sealed enclosure.
Figure 2B:
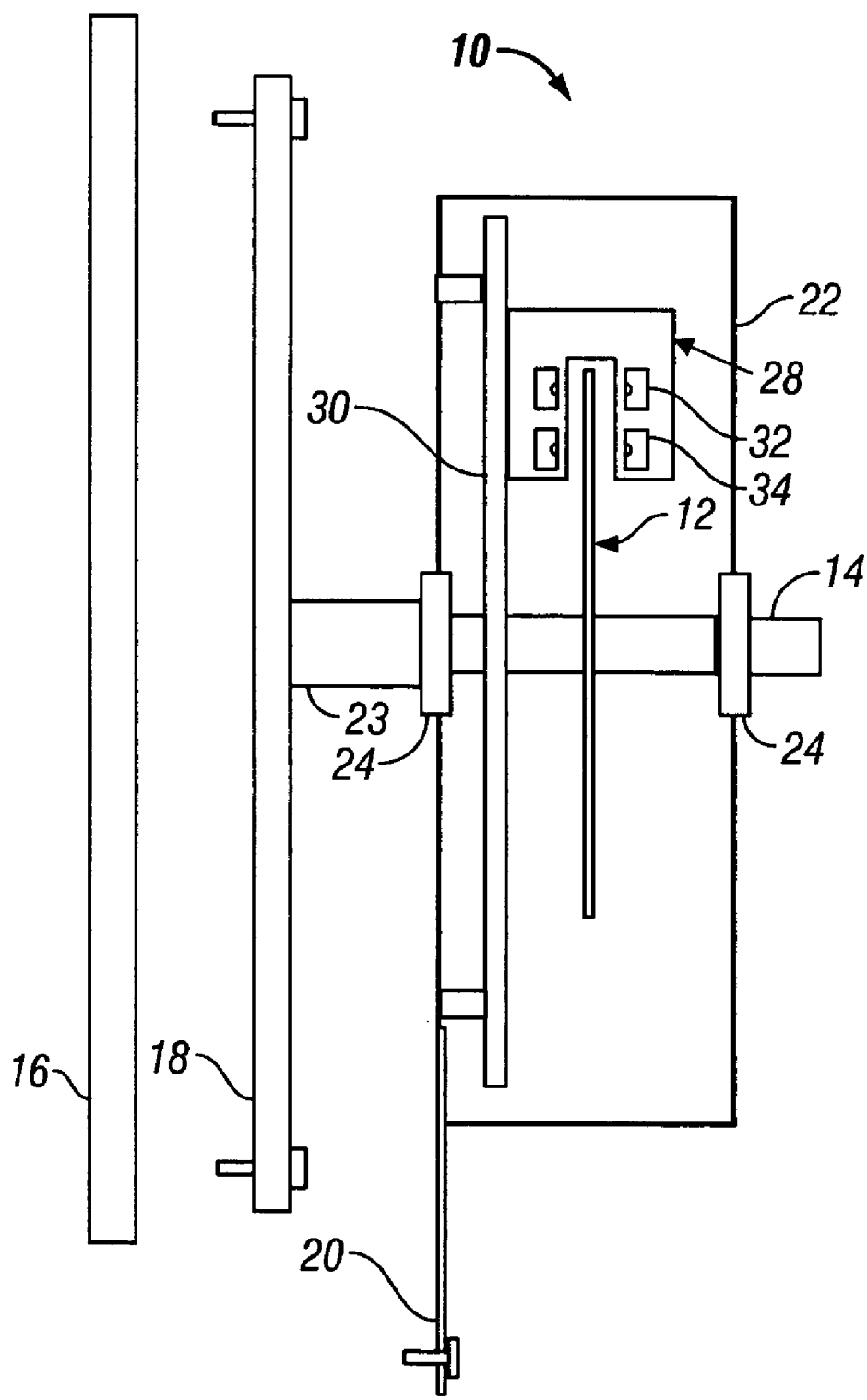
FIG. 2B is a side cross-sectional view showing the rotation sensing system attached to a mount plate in alignment over a rotating plate, the rotation sensing system covered in a sealed enclosure.

In the embodiment shown in FIG. 2A, the rotor shaft 14 is connected to either a cam shaft or a crankshaft. The embodiment as illustrated at FIG. 2B has the rotation sensing system attached to a rotating plate 16. In this embodiment a mount plate 18 is attached to the rotation sensing system and the mount plate 18 then secured to the rotating plate. In both FIGS. 2A and 2B an anchoring strap 20 is used to prevent rotation of the rotation sensing system.

A sealed enclosure 22 is connected to the shaft 14 by seal bearing 24. A collar 26 may extend from the seal bearing 24 to assist in connecting the rotation sensing system 10 to shaft 14. The sealed enclosure 22 protects the instruments of the rotation sensing system 10. The enclosure 22 permits the rotation sensing system 10 to be placed in environments of an internal combustion engine that may be dirty or exposed to oil, soil, and weather elements.

The rotation sensing system 10 has an optical sensor 28 mounted to a stationary frame 30 and is attached to the bottom of the seal enclosure 22. The optical sensor 28 includes a counting cell degree sensing cell 32 and a top dead center (TDC) sensing cell 34. In the illustrated embodiment, the sensing cells 32, 34 are optical sensors, magnetic sensors or other types of sensors could alternatively be used.

The wheel 12 includes counting slots 36 around a circumference of the wheel 12. The counting slots 36 are uniformly spaced representing degree increments about the circumference of the wheel 12. Located concentrically inside the counting slots 36 is a top dead center slot 38. The rotation of the wheel 12 relative to the sensor 28 causes the TDC slot 38 to pass adjacent the TDC sensing cell 34 and causes the counting slots 36 to pass adjacent the degree sensing cell 32. The sensor 28 then sends a series of count signals corresponding to each of the counting slots 36 and a top dead center signal corresponding to the top dead center slot 38 through cable 40 to an intelligent controller 72. The intelligent controller 72 may be housed in a control box 44 or may be integral within the enclosure 22. The intelligent controller 72 is typically a microcontroller that may be programmed by a computer.

Figure 3A:
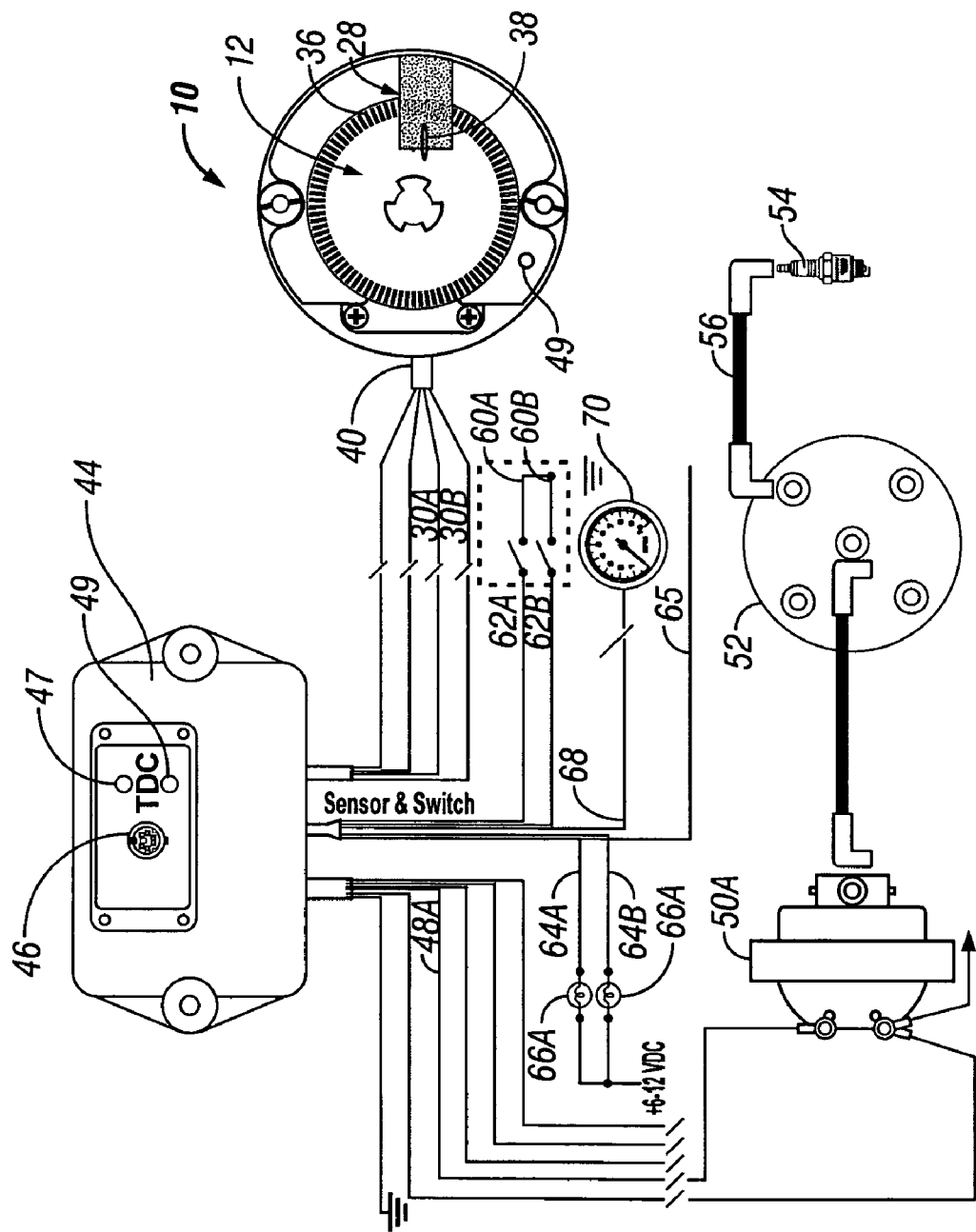
FIG. 3A is a layout of an engine control system for a four cylinder engine with a distributor.

As seen in FIGS. 3A–E, the control box 44 has a programmed connector 46 which provides connection to the intelligent controller 72. The control box 44 has two lights, namely a program light 47 and a TDC light 49. The program light 47 is lit when the microcontroller is in a programmable state. The TDC light 49 is an LED that is lit when the TDC slot of wheel 12 is triggering the TDC sensing cell 34. A matching TDC light 49 is on the rotation sensing system 10. The control box 44, when a stand alone unit as seen in FIGS. 3A–E or when incorporated into the same body as the rotation sensing system 10, includes circuitry to be described below for creating a plurality of engine controlling output in response to at least one of the cylinder position or the engine RPM. The intelligent controller is connected to circuitry to be described below for creating a plurality of firing signals which are transmitted through connecting line 48 to ignition coil 50. As seen in FIG. 3A, the ignition coil 50A is connected through a distributor cap 52 to four spark plugs 54 and is capable of discharging to provide sparks to each of the spark plugs in response to the various firing signals received through line 48A. The distributor 52 distributes the various sparks through distribution lines 56 to spark the plugs 54.

Figure 3B:
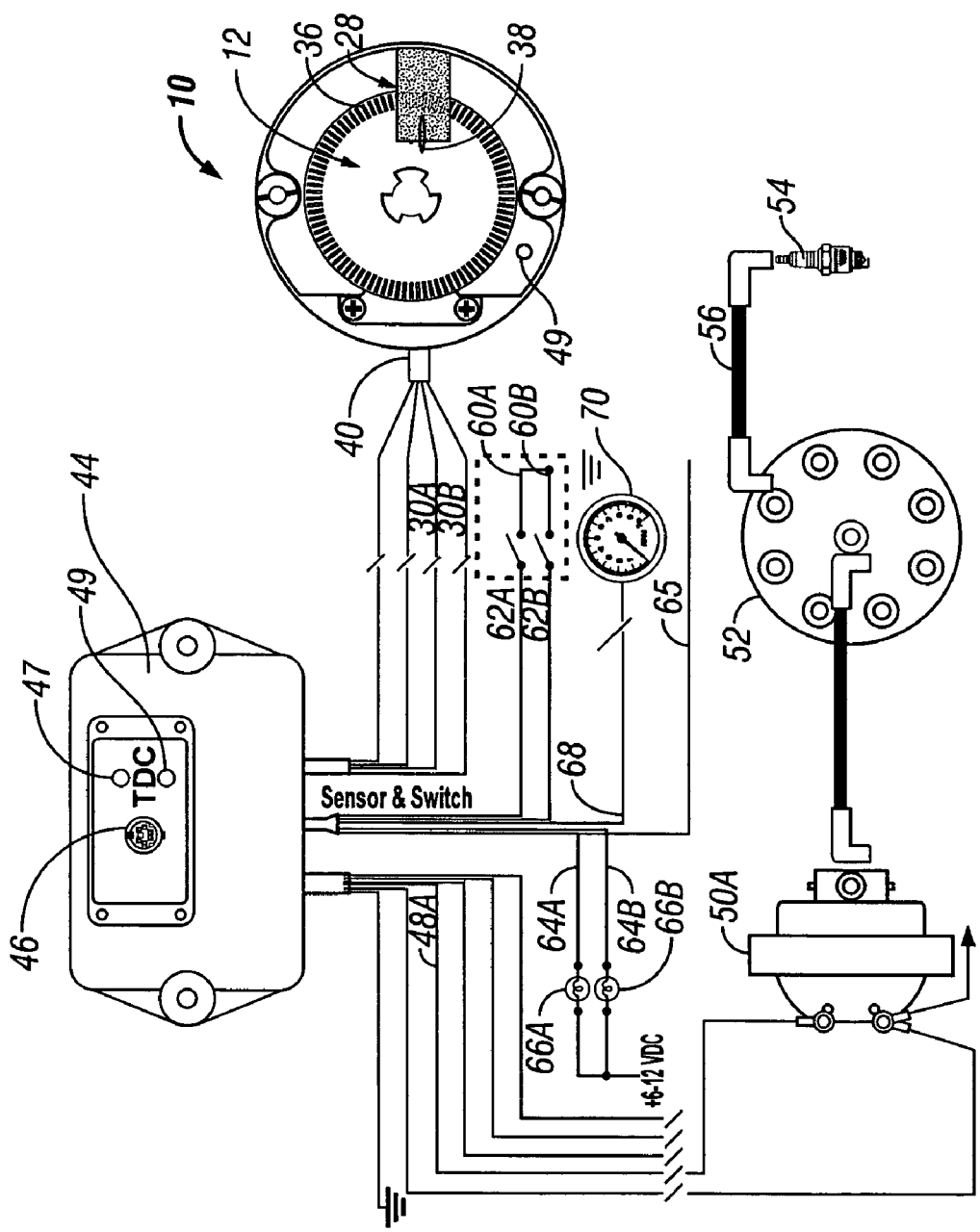
FIG. 3B is a layout of an engine control system for an eight cylinder engine with a distributor.

As seen in FIG. 3B, a single coil 50A may be used with an eight cylinder distributor cap the same as a four cylinder distributor cap. This is similar for all distributor based ignition systems regardless of the number of cylinders used in the engine.

Figure 3C:
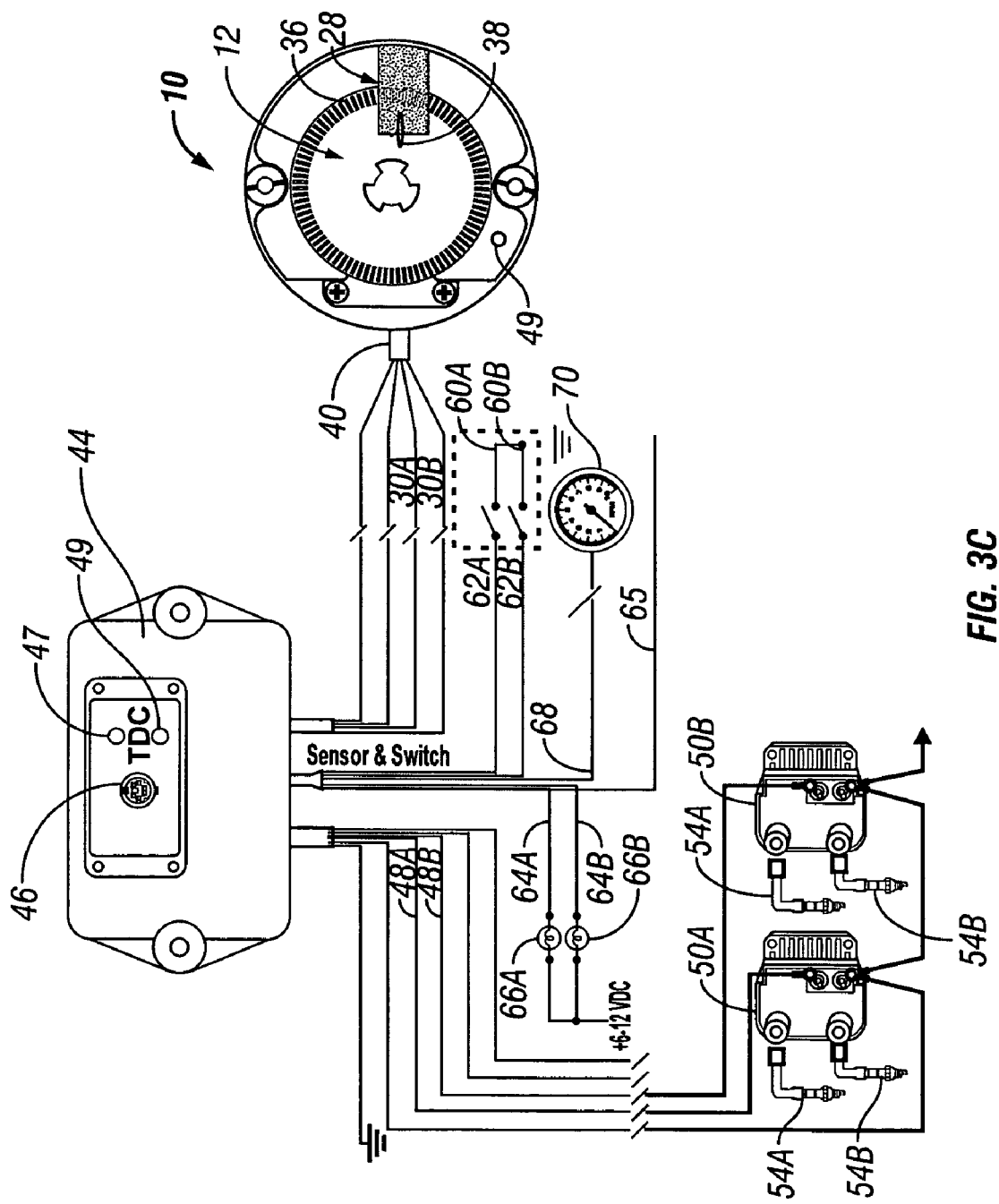
FIG. 3C is a layout of an engine control system for a four cylinder engine without a distributor.

The intelligent controller may also control distributorless engines using a system of multiple coils. FIG. 3C illustrates a four cylinder engine that does not use a distributor. In this scenario the intelligent controller transmits a firing signal through a first connecting line 48A and a second connecting line 48B to ignition coils 50A and 50B. Each ignition coil 50A and 50B has two outputs, one for each spark plug 54A–B. Because each ignition coil 50 has only one firing signal connecting line 48A or 48B both spark plugs fire at the same time and when one spark plug is firing into a cylinder the other cylinder which is at a 180° angle will have a waste spark that does not affect the cylinder performance.

Figure 3D:
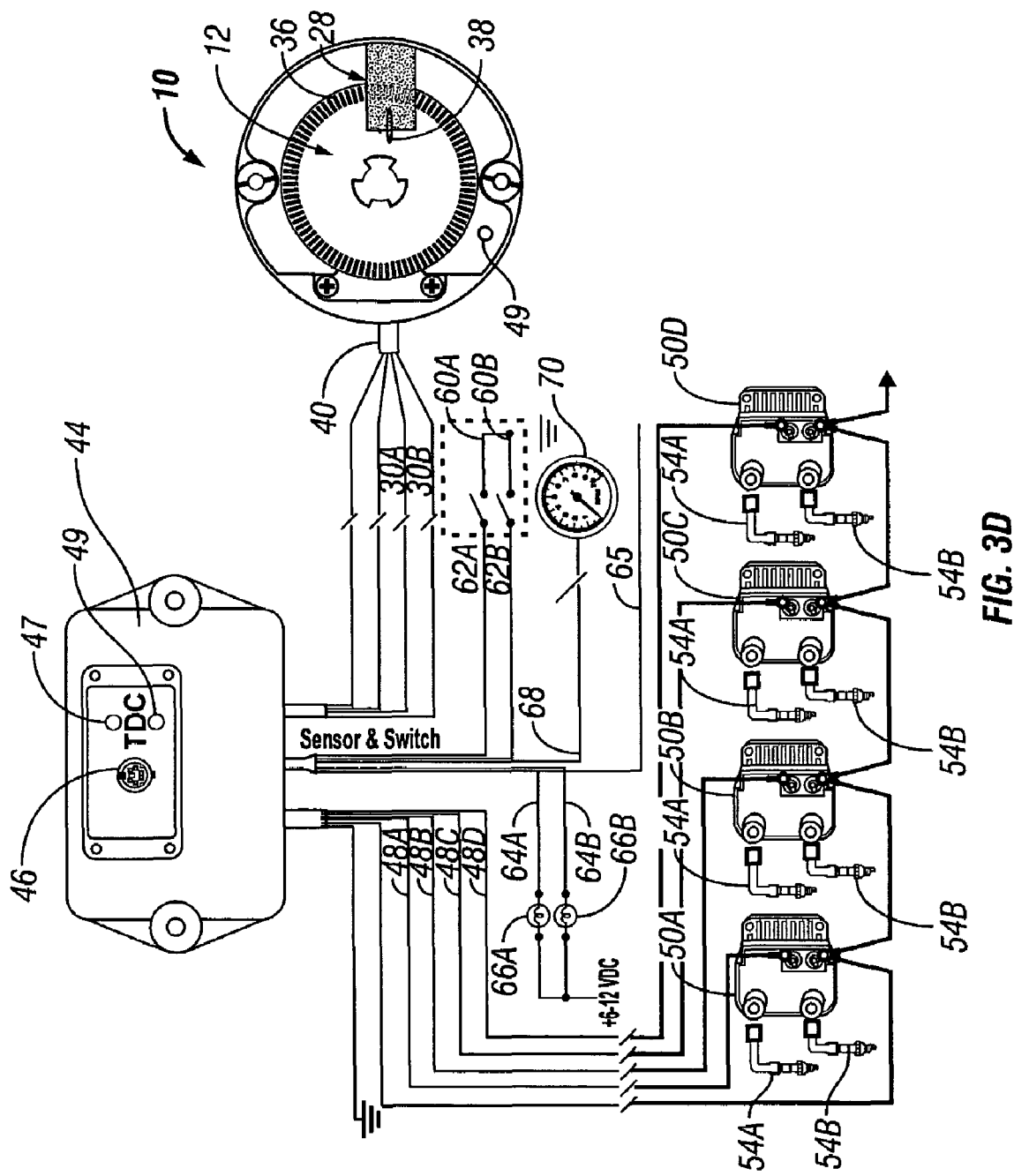
FIG. 3D is a layout of an engine control system for an eight cylinder engine without a distributor.

FIG. 3D illustrates use upon an eight cylinder engine without a distributor. As seen, four coil units 58A–D are connected to the intelligent controller by connecting lines 48A–D, respectively. Each ignition coil 50A has two outputs. Similar to the four cylinder distributorless scenario, both spark plugs fire at the same time so there will be a waste spark for the cylinder situated at 180° away from the cylinder in firing position. The configuration as seen in FIGS. 3C and 3D can be adapted for a number of cylinders above eight.

Figure 3E:
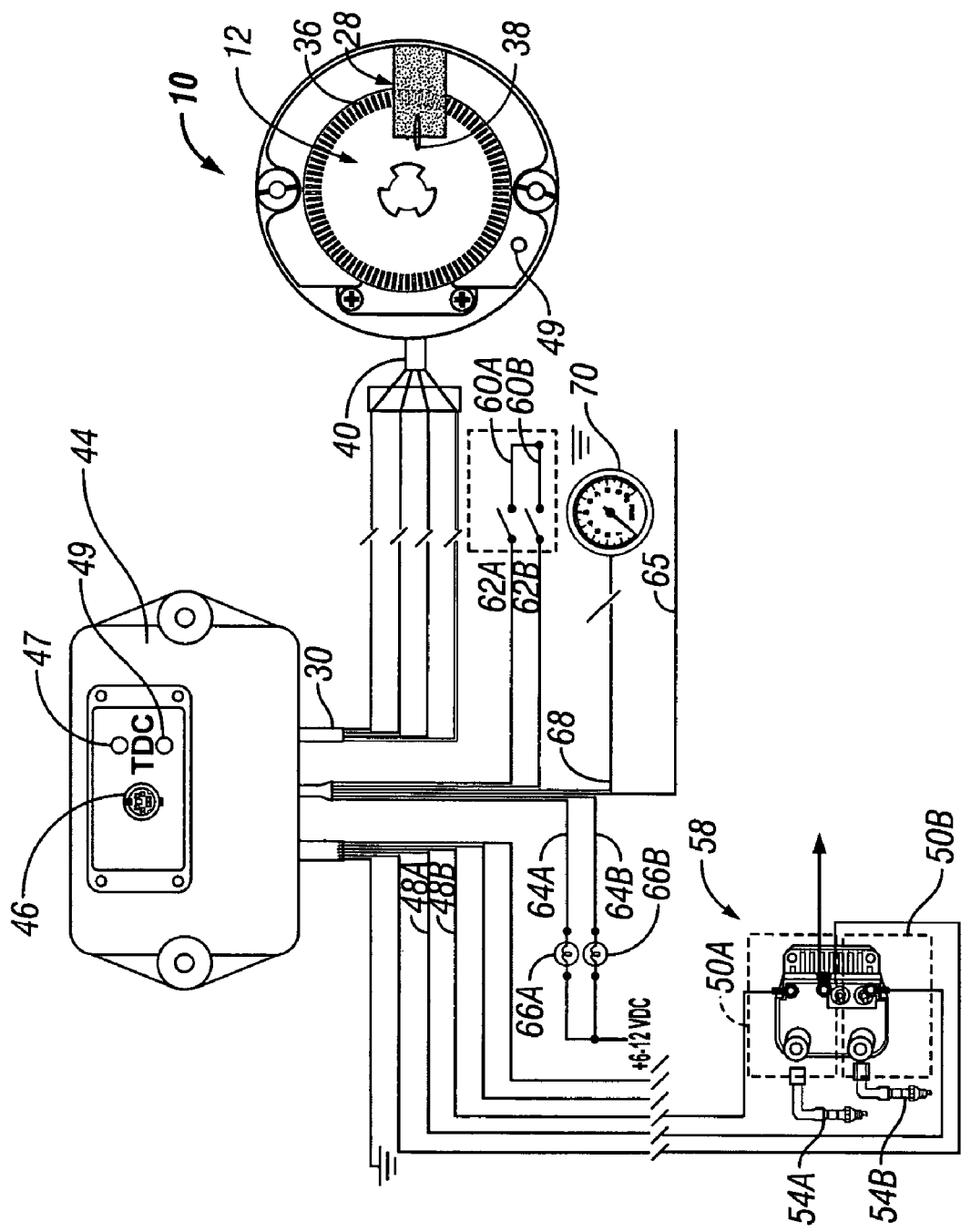
FIG. 3E is a layout of an engine having a 45° offset of cylinders using a coil unit with two independent ignition coil.

Another typical scenario that may be controlled by the intelligent controller is seen in FIG. 3E which illustrates control of an engine that does not have regularly offset cylinders. For example, Harley-Davidson® motorcycles have a 45° offset of cylinders as opposed to the typical 180° offset. Accordingly, two connecting lines 48A and 48B are connected to the circuitry of the intelligent controller and control two coils 50A and 50B housed within a common coil unit 58. Each individual coil 50A and 50B controls the individual spark plug 54A and 54B.

Figure 8:
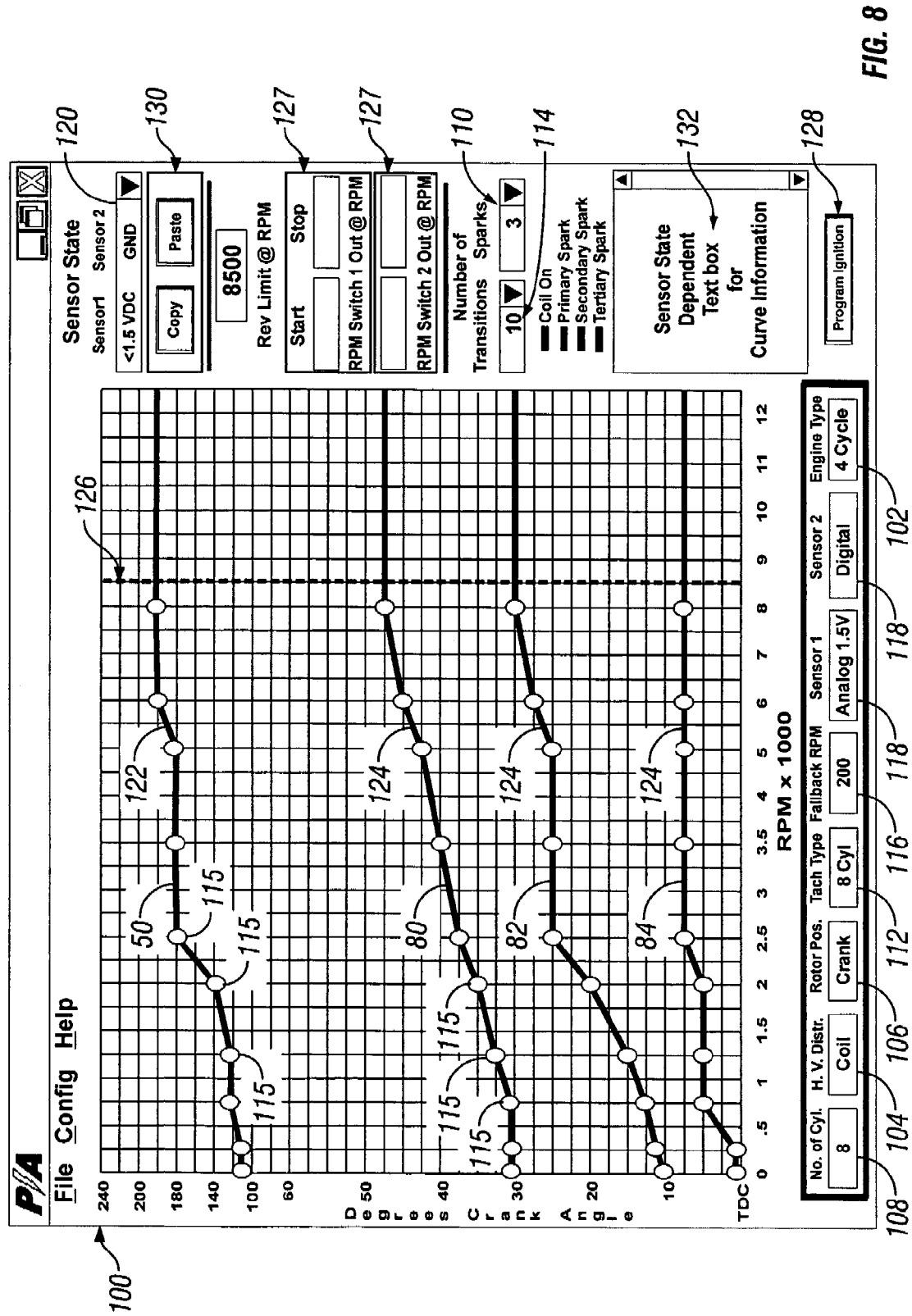
FIG. 8 is the graphical user interface utilized to modify the program in the intelligent control of the engine control system.

In use, the intelligent controller sends a plurality of firing signals to the coils 50 to provide sparks to each of the spark plugs in response to the various firing signals received through the line 48. The number of sparks per cylinder may range from one to a plurality of sparks but is most typically two or three sparks per cylinder. The intelligent controller can vary the spacing between the plurality of sparks based upon the engine RPM. The engine RPM is calculated by the input received from the optical sensor 28 and specifically the speed at which the counting slots 36 pass through the sensor 28. A graphical representation of the spacing between sparks relative the degrees crank angle and the engine RPM is illustrated in FIG. 8. This graphical information may be entered by the user into the computer and transferred to the intelligent controller held within the control box 44.

The relationship of a spark firing may be influenced by digital sensors present monitoring the engine performance. As seen in FIGS. 3A–E, two digital sensors 60A and 60B are present. These are joined to the intelligent controller by connecting wire 62A and 62B respectively. Although illustrated as digital sensors, they may also be analog sensors. When used with an analog sensor, a sensor reference 65 is provided because an analog sensor provides output in a voltage as opposed to an on/off state as with a digital sensor.

When using two different types of sensors four different ignition spacing curves are permitted. This is illustrated in the below table.

Table 1: Relationship Between Sensor State and Sensor 1 and Sensor 2.

(0 represents low (grounded if digital or below the transition voltage if analog) and 1 represents high (not grounded if digital or equal to or above the transition voltage if analog)).

|  | SENSOR 1 | SENSOR 2 |
|---|---|---|
| Sensor State 1 | 0 | 0 |
| Sensor State 2 | 0 | 1 |
| Sensor State 3 | 1 | 0 |
| Sensor State 4 | 1 | 1 |

As seen in the above table, unique curves may be developed for each of the different sensors states shown. Alternatively, additional sensors may be used. Each additional sensor employed with the intelligent controller doubles the number of curves possible for ignition and engine control systems.

Also seen in FIGS. 3A–E are RPM switches 66A and 66B. The intelligent controller submits signals to switches 66A and 66B through connecting wire 64A and 64B respectively. These switches are controlled by programmed start and stop limits; for example, RPM switch is open at a low RPM and closed at a high RPM. These sensors are useful for such things as nitrous dioxide control, transmission shifting, transmission shift lights, fuel injection systems, charging systems, and vehicle lighting systems. The RPM switches 66A and 66B may have different settings for each sensor state selected in response to digital sensors 60A and 60B.

As further seen in FIGS. 3A–E, a tachometer output from the circuitry leading from the intelligent controller is provided. The tachometer 70 may be any one of different models including those for use with four cylinder engines, eight cylinder engines, etc. Typically, a tachometer must be specifically paired for the engine type because it calculates engine speed by the number of sparks being provided to the cylinders. Accordingly, an eight cylinder tachometer could not be used for a four cylinder tachometer for a four cylinder engine because the engine RPM would register as half the engine speed that is typically occurring. In addition, the tachometer 70 would count each spark to a spark plug and when multiple sparks are used per cylinder, this would affect the RPMs displayed. In FIGS. 3A–E, the intelligent controller submits the correct amount of signals to the tachometer. Therefore, an eight cylinder tachometer can be used for a four cylinder tachometer because the intelligent controller is submitting the required signals to the tachometer through a connecting wire 68 so that the tachometer will read a correct RPM.

Figure 4:
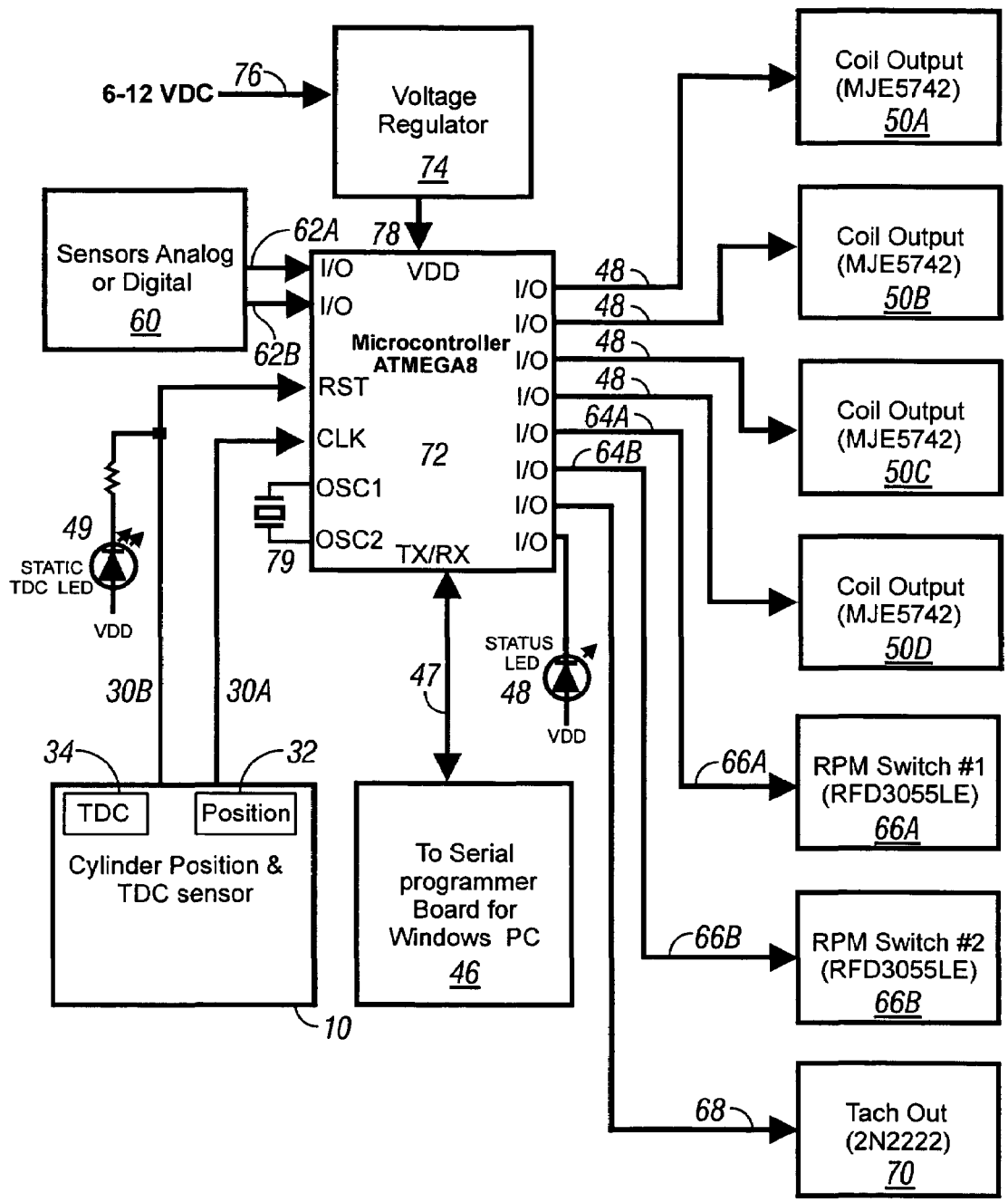
FIG. 4 is a block diagram of the various components of the engine control system of the present invention.

FIG. 4 is a block diagram of a circuitry which appears within the control box 44. The intelligent controller is labeled by numeral 72. The count signals from the degree sensing cell 32 and the top dead center signal from the top dead center sensing cell 34 are sent through cable 30A and 30B, respectively, to the intelligent controller 72. As seen in FIG. 4, the intelligent controller is a microcontroller chip and specifically an ATMEGA8. The microcontroller 72 receives the count signals into a clock (CLK) port which counts the number of pulses from the degree sensing cell 32. The top dead center signal goes into the reset position on the microcontroller. Programming within the microcontroller enables the microcontroller to be used for either the crankshaft or the cam shaft as one full turn of the wheel 12 equals a full turn of the crankshaft and the cam shaft rotates at one-half the RPMs of the crankshaft. Every time the top dead center sensing cell sends a signal it resets the microcounter counting the count signal coming from the degree sensing cell 32.

The microcontroller 72 calculates cylinder position by counting the count slots 36 as they pass the degree sensing cell 32. Each counting slot 36 is positioned in 4° increments. Accordingly, there are 90 count slots in a 360° rotation of wheel 12. Alternatively, other numbers of slots 36 may be used. Each count slot 36 corresponds to a different degree position of the piston within the cylinder. While different slot spacing may be chosen, the degree positions are illustrated in four degree intervals. Because the wheel 12 is directly mechanically connected through rotor shaft 14 to the cam shaft (not shown) or other means and these are driven by the piston (not shown), the degree positions represented by the marks 36 precisely represent the degree positions of the piston within the cylinder.

In FIG. 1, the top dead center markers 38 is shown being sensed by the TDC sensing cell 34. This, as previously mentioned, resets the microcontrollers counting to zero. The next count slot to encounter the degree sensing cell 32 is one of the count sensors representing a 4° rotation. This creates a count signal to be transmitted through connecting line 30A that causes the microcontroller 72 to increment one count. As each additional count slot 36 encounters the degree sensing cell 32, the clock on the microcontroller 72 is incremented an additional count until the TDC slot 38 is encountered, at which time the clock is reset. The 4° increments are precisely calculated, however, additional accuracy may be desired. For increments between 4° a time delay is calculated within the microcontroller 72 to permit a higher degree of resolution. Additionally, the microcontroller 72 has programming which permits the microcontroller to adjust for the rotation of either the cam or crank shaft.

The microcontroller 72 calculates the degree position of the cylinders and an engine RPM. The microcontroller 72 compares programmed commands stored within its memory to the engine RPM and the cylinder position. When a cylinder position is at a designated distance away from top dead center, the microcontroller will send a firing signal to a coil 50. The intelligent controller 72 assumes a 2° length of spark from the coil and then counts the degree distance until the secondary spark. Similarly, a third spark may also be used. The intelligent controller assumes a 2° spark length from the coil firing position and then counts until the cylinder degree position is reached by the degree sensing cell 32 and then sends a signal to fire a third spark to the coil 50. The intelligent controller sends these signals through connecting line 48. The microcontroller also sends signals to the coils 50 to charge. The coil will not fire a spark from the firing signal without having a charging signal sent to it. Typically the charging signal occurs several degrees before top dead center to ensure adequate charging. In addition, the charging time of the coils is independent of engine speed and therefore, as engine speed increases, the coil is programmed to turn on at a greater number of degrees from top dead center.

The count signals from the degree sensing cell 32 are received by the intelligent controller 72 to create an RPM signal corresponding to the RPMs of the engine. The RPM signal is compared in the microcontroller 72 to the preprogrammed RPM levels as programmed by the user and uploaded into the microcontroller 72. The RPM levels are adjusted by means of the computer program as subsequently described below. As the RPMs increase or decrease as determined through the degree sensing cell 32 different RPM settings from the user's preprogrammed units are selected. When a match is made between the RPM signal and one of the preset RPM levels is made, different ignition timings are selected for the primary, secondary and tertiary sparks. Moreover, a different coil charge time is also determined based upon comparing the RPM signal to the RPM settings.

A graphical representation of coil charging and spark timing is seen in FIG. 8 which shows for example at 0 RPMs the coil 50 goes on at 110° before top dead center (BTDC) of the cylinder, the primary spark 80 on at 32° BTDC, the secondary spark 82 on at 10° BTDC, the tertiary spark 84 at 1° BTDC. In this graph, as the RPMs speed up the sparks are adjusted, for example, at a speed of RPM 2,000 the coil is turned on at 140° BTDC, the primary spark 80 at 35° BTDC, the secondary spark at 20° BTDC and the tertiary spark at 5° BTDC. As stated previously, the coil 50 charges from the original set point until the first spark 80. The primary spark 80 is assumed to last for 2° and then a coil is once again charged until the secondary spark 82. The secondary spark 82 is assumed to last for 2° and the charging begins again until the tertiary spark occurs.

Figure 9:
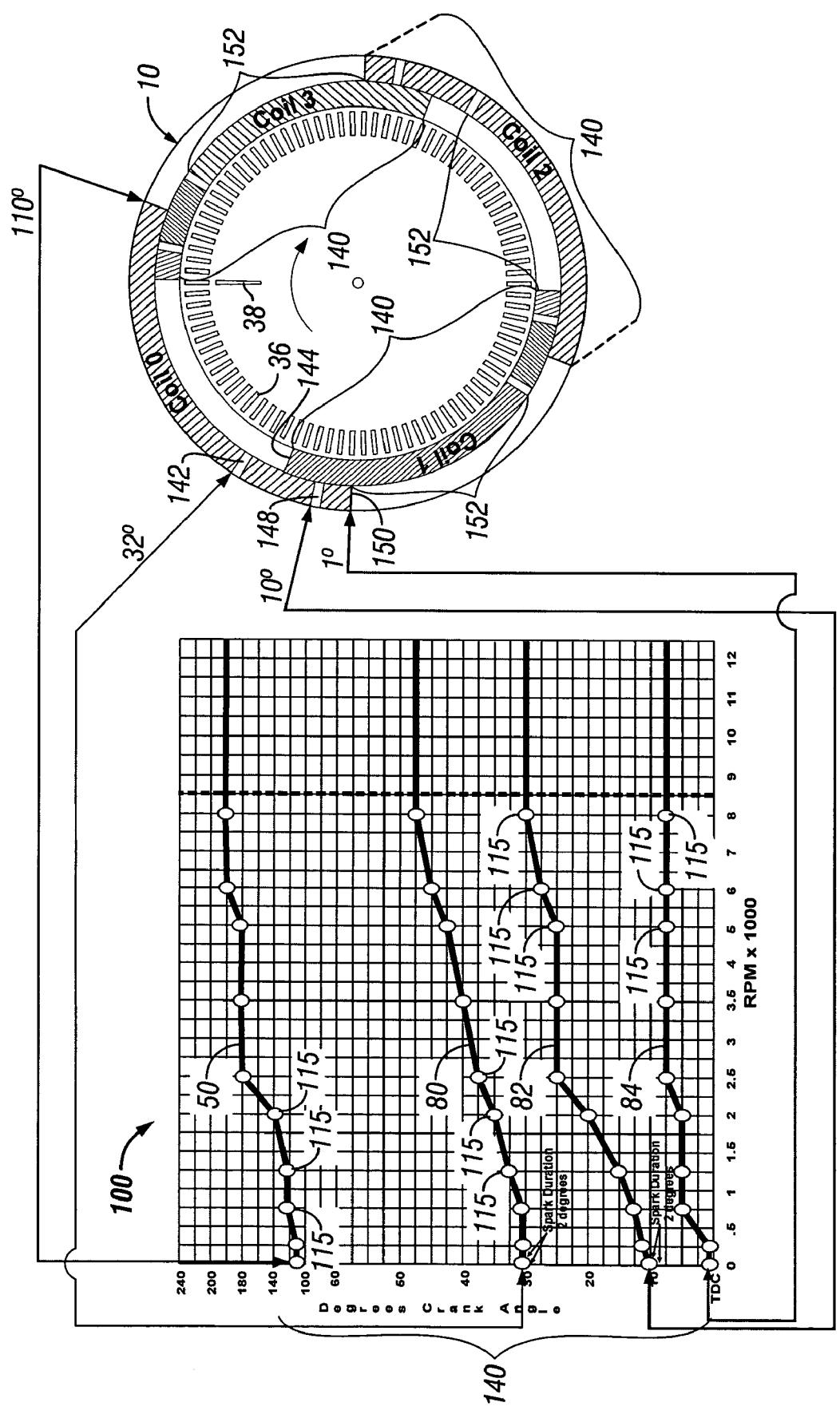
FIG. 9 is an illustration of the graphical using interface ignition cycle paired with the rotation sensing system.

This system is also graphically illustrated in FIG. 9 and compared with the rotation sensing system 10. It should be noted that the user friendly graphical interface permits the user to intuitively program coil charging and spark ignition in degrees before top dead center of each cylinder. This is in contrast to the rotation sensing system 10 which calculates all signals going to the coil and to each cylinder based upon degrees after the top dead center slot 38.

A TDC LED light indicator 49 is visible outside the rotational sensing system 10 and the control box 44. The TDC light 49 is a static timing light. The light 49 is used during the initial mounting of the wheel 12 on the rotor shaft 14 onto the cam shaft (not shown). The engine as indicated by a tiny mark is placed at the top dead center, and the wheel 12 is rotated until the TDC slot 38 is sensed by the degree sensing cell 34. This causes the static LED 49 to turn on and indicates to the operator that the wheel 12 has been properly set with respect to the rotational position of the engine. LED 47 represents that a connection has been made with a computer (not shown) and that the microcontroller 72 is ready to be programmed.

As seen in FIG. 4, a voltage regulator 74 receives power from a battery that is typically 6 to 12 volts. As shown previously, the microcontroller 72 is programmable through input 46.

The microcontroller 72 controls coils 50A–D using connecting line 48A–D. The microcontroller controls RPM switch one 66A and RPM switch two 66B through a connecting line 64A and 64B, respectively. The tachometer 70 is controlled through signals coming from connecting line 68.

Figure 5:
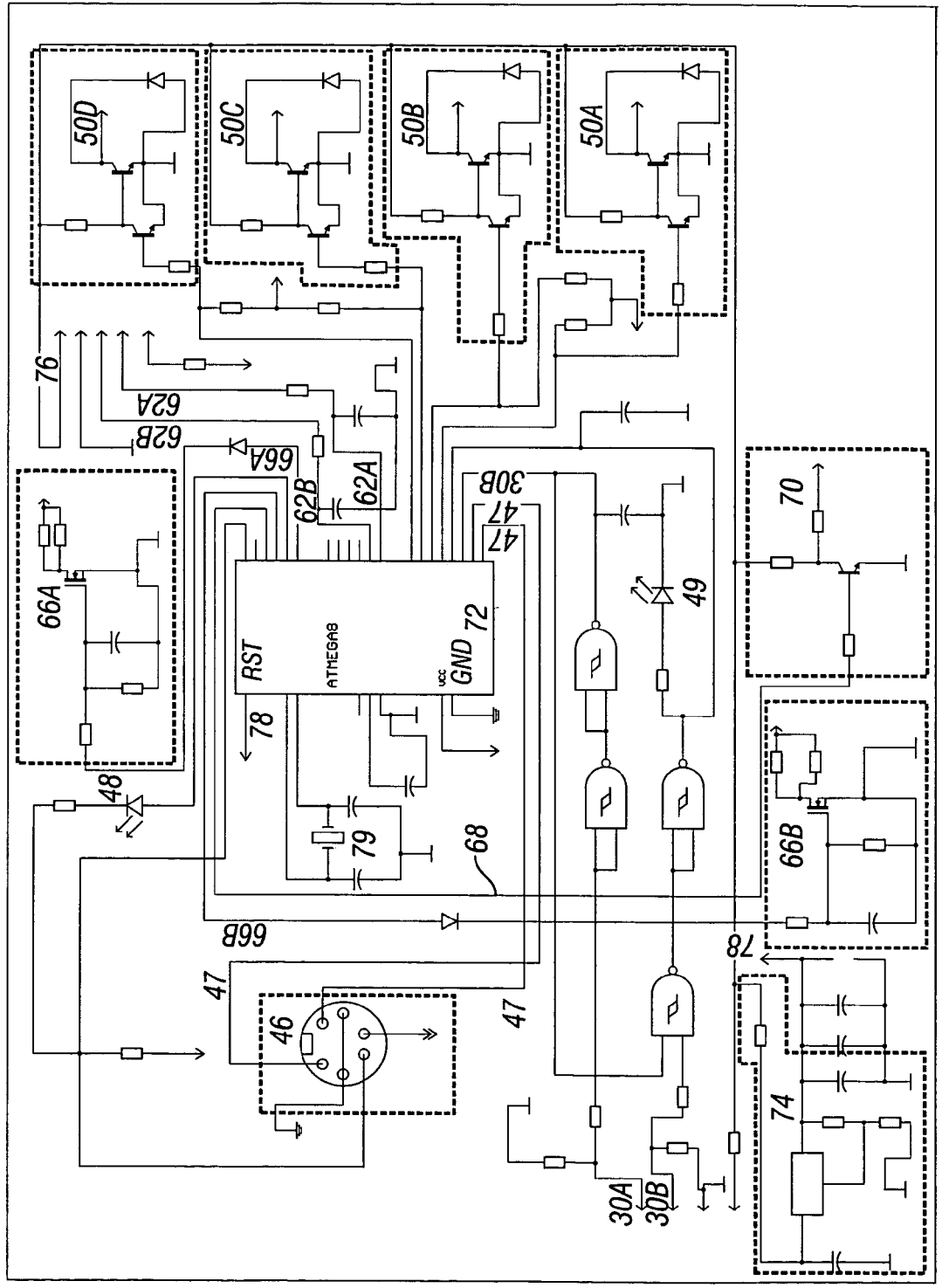
FIG. 5 is an electrical schematic of the components shown in the block diagram of FIG. 4.
Figure 6:
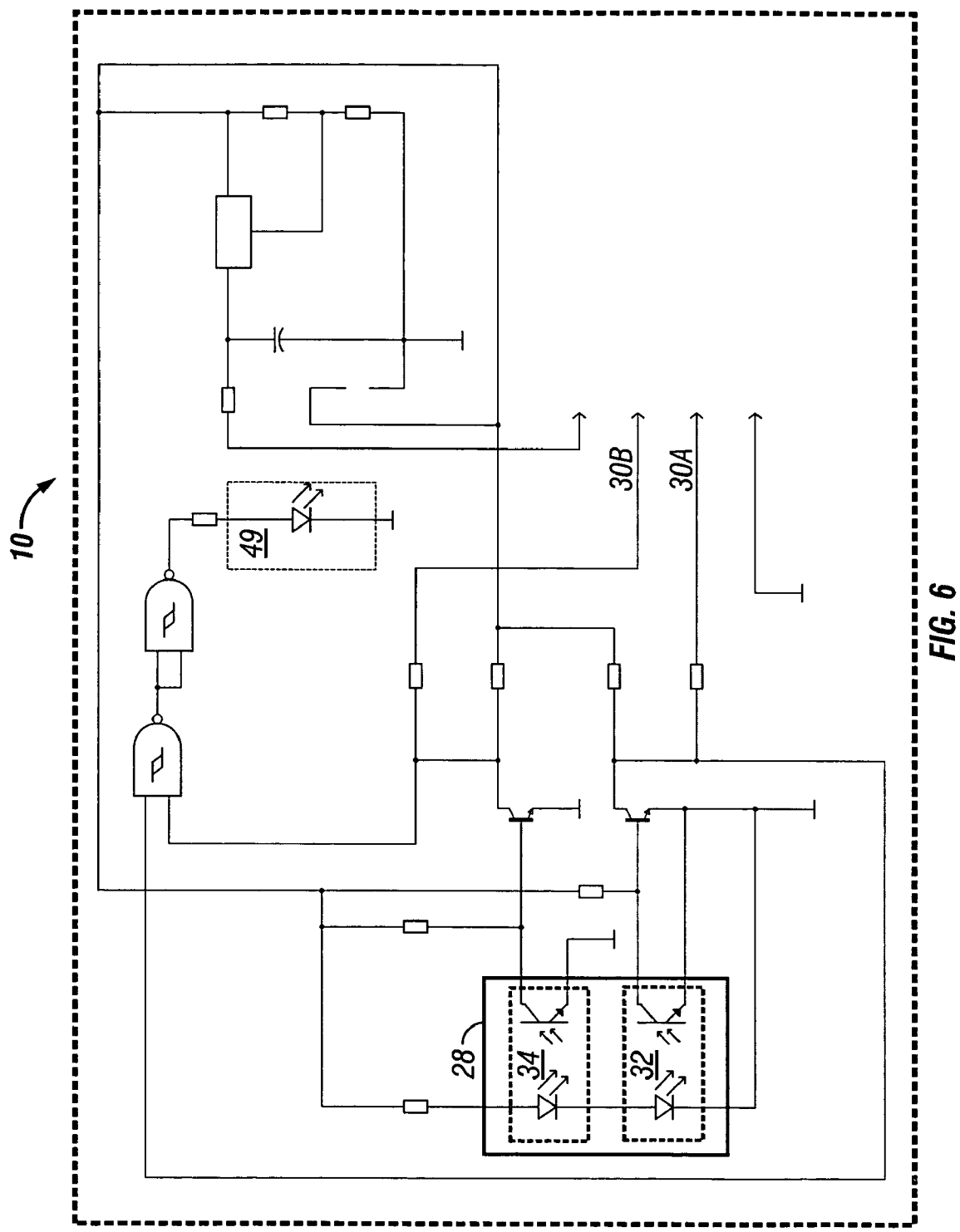
FIG. 6 is an electrical schematic of the rotation sensing system shown in the block diagram of FIG. 4.

Referring to FIGS. 5 and 6, the various blocks in the block diagram of FIG. 4 are shown in shadow lines.

Figure 7:
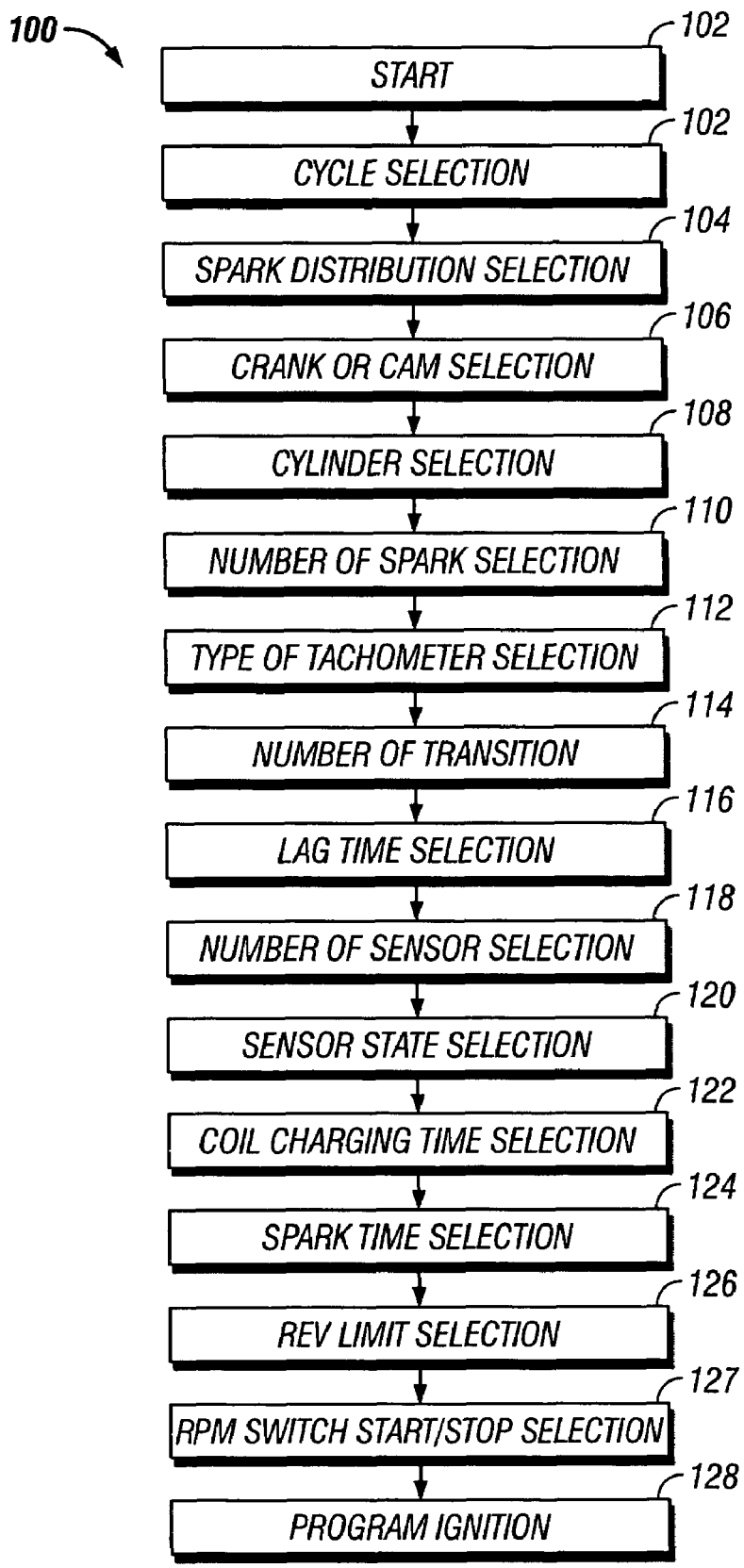
FIG. 7 is a flow chart of the programming sequence used to program the microcontroller.

FIG. 7 is a flowchart used to program the microcontroller 72. This flowchart illustrates the decisions that are made by the user to correctly program the microcontroller for various parameters of the engine and mounting of the wheel upon a rotating piece of the engine. These questions may be presented to the user in the form of a wizard or other graphical computer interface. Alternatively, the user may independently select the steps to program the microcontroller. This flowchart is generally referred to as the engine control development system or when used with an ignition the ignition development system and labeled by the numeral 100. Alternatively, a similar method could be used to develop systems for a vehicle including a fuel injection system for an engine, a lighting system, etc.

In the cycle selection step 102, the user decides whether the engine being programmed is a two or four cycle engine. The user then proceeds to a spark distribution step 104 where the user determines whether the spark will be coming from a coil or a distribution cap. Next, the user proceeds to a crank or cam selector step 106 where the user determines whether the rotation sensing system 10 will be attached to the crank or cam shaft. This selector permits the software program to perform differently because the crank shaft operates at twice the cam shaft. Although the rotation sensing system 10 may be mounted to a rotating plate, this plate will typically rotate at the speed of either the cam or the crank shaft.

The user then proceeds to a cylinder selection step 108 where the user chooses how many cylinders the engine is operating at. The user is provided with a drop down menu of cylinders between one to eight or whether it is of a specific cylinder offset such as a Harley-Davidson® motorcycle that has a 45° offset between cylinders. Different cylinder numbers greater than eight are provided for this invention as well as different cylinder offset different than a 45° angle.

The user then proceeds to a number of spark selection step 110 in which the user determines how many sparks will be utilized during a compression stroke. As illustrated in FIGS. 8 and 9, the number of sparks selected is three. The invention provides for anywhere between one and a plurality of sparks per compression stroke.

The user then moves to a type of tachometer selection step 112. As previously described, the intelligent controller 72 can submit a signal corresponding to the type of tachometer 70. This step permits the display of engine revolutions per minute independent of a tachometer's original design. This allows the user to utilize a variety of different tachometers based on quality as opposed to a specific type required to function with their engine type.

The user then proceeds to a number of transition selection step 114. This permits the user to decide how many increments of resolution are to be for an ignition or coil charging curve.

The user then proceeds to a lag time selection step 116. In this step, the user determines the fall back to accommodate deceleration by the engine. There must be some fall back at each transition point when decelerating. For example, if the ignition advances at 2500 RPM the user does not want it to retard at 2450 RPM. Because if the engine were operating at approximately 2500 RPM, the ignition at this point could potentially be "jittering" back and forth causing erratic performance. A lag time or fall back selection provides an adjustable RPM value. When decelerating the curve fall back causes the advance point to shift down by a user defined lag time RPM value. The advance points programmed into the ignition are initiated when accelerating but when decelerating the time shifts by the curve fall back or overlap value. Therefore, when the user then again accelerates it would return to its RPM value again when it hits a transition step.

The user then proceeds to a number of sensor selection step 118. As illustrated in FIG. 8, the user is permitted selection between one or two sensors. Other embodiments may permit selection of more than two sensors. The user must then determine what type of sensor is used in a sensor type selection step. The user may use digital, analog, or a combination of digital and analog sensors. The user when using an analog sensor must enter the transition voltage for determination between an on and off state of the sensor. As seen in FIG. 8, the sensor is in an on state when it is less than 1.5 VDC. A digital sensor is either in an off state or an on state. The user must determine whether ground represents the on state or the off state independently of the computer program interface.

The user then goes to a coil charging time selection step 122 in which each coil charging time is moved per interval or transaction node. The efficient charging of the coil promotes coil life by keeping the coil turned off when not needed to avoid over heating as well as ensure a proper charging for discharge of the spark during the primary, secondary and tertiary sparks. The user proceeds to a spark time selection step 124 in which the user selects the timing of the primary, secondary, tertiary sparks. The user does this independently for each spark selected.

A revolution (rev) limit selection step 126 provides the user with a level at which the engine shuts off. This is done to prevent engine damage.

The user then proceeds to an RPM switch stop/start selection step 127 where the user determines at the RPM level at which to engage an RPM switch 66.

The user then has a program ignition step 128 in which the program is uploaded into the intelligent controller 72.

As seen in FIG. 8, the method of programming is graphically adjustable by the user. FIG. 8 illustrates an example in which in the cycle selection step 102 the user has chosen a four cycle engine. In addition, the user has selected in the spark distribution selection step 104 a coil. In the crank or cam selection step 106, the user has selected a crank. In the number of cylinder selection step 108, the user has selected an eight cylinder engine. In the number of sparks selection step 110, the user has selected three sparks namely the primary spark 80, the secondary spark 82, and the tertiary spark 84. In the type of tachometer selection step 112, the user has decided to use a tachometer made for an eight cylinder engine. The user selected in the number of transition step 114 ten. Alternatively, the user could select between one to a plurality of transitions for adequate steps. The user has selected in the lag time selection step 116 a 200 RPM fall back value. The user has selected in the number of sensor selection step 118 and the sensor type selection 120 an analog 1.5 sensor for sensor one and a digital sensor for sensor two. The user has also selected in the sensor state selection to program the coil and spark timing curves for when sensor one is less than 1.5 VDC and the digital sensor is at a ground setting. This setting corresponds with sensor state one as previously illustrated in Table 1 of the patent application in which both sensors are in an off position. An additional copying step 130 permits the ability to copy and paste the curves from one sensor state selection to the next. The user can then manipulate the coil by a coil changing time selection step 122 in which the transition points or nodes 115 are dragged to specific RPM levels and to higher or lower degrees BTDC. Similarly, the user can utilize a spark time selection step 124 to move the primary spark, secondary spark and tertiary spark to adjust the spark timing based upon RPM and degrees BTDC. The user can also select a rev limit in selection step 126 in which the engine is turned off when the engine is in danger of being damaged. The user is also permitted setting RPM switches for start and stop times in step 127. These receive an output from the intelligent controller at a start RPM and stop RPM. Programming of this is done in RPM switch step 127. Once this information is programmed the user engages the program ignition by clicking upon the program ignition button to engage the program ignition step 128. Reference information may be stored in a text box 132.

FIG. 9 is provided as an illustration of the interaction between the ignition development system 100 and the rotation sensing system 10. At the program ignition step 128 the values of the ignition coil curve 50, the primary spark curve 80, the secondary spark curve 82, and the tertiary spark curve 84 are translated into values and stored for use by the microcontroller. The microcontroller 72 also monitors the engine RPM and delivers commands to the ignition coil 50 based upon the revolutions per minute of the rotation sensing system and the stored values in the microcontroller calculated from the user's graphical interface. At steady states, the coils operate continuously as seen in FIG. 9 with each cylinder having a common ignition cycle 140; however, during start up or at an interval transition, look up values as seen in FIGS. 10–14, must be accessed. These look up values are pre-loaded into the microcontroller based upon the engine type. In this example, the engine type is eight cylinder and the relevant cells are bordered as such. In addition, the number of values are further reduced by isolating the tables by whether or not they are connected to the cam or crank shafts. In this example, the crank shaft has been selected and these values downloaded into the microcontroller.

During curve transition, all coils are initially charged. An initial spark location 142 is calculated after the TDC slot 38 assuming that counting begins at 8° after top dead center plus a sensor error offset of 1°. The 8° after top dead center is used as a way of purging data and resetting the microcontroller tables. This is done to assure accurate performance of the rotation sensing system 10.

Turning to the initial spark table as illustrated in FIG. 14, a 32° value from the Y axis of the ignition development system 100 for BTDC results in a value of 49 counts after TDC. Working backwards, the 49° count value adding an 8° count after TDC plus a sensor offset error of 1° equals 58° and subtracting 58° from 90° yields 32°. The subtraction of 90° is required because the graphic user interface instructs the user to calculate BTDC of each cylinder whereas the rotation sensing system calculates in degrees after top dead center of the TDC slot 38 for the entire wheel 12.

As initially all coils are turned on, the spark at initial spark location 142 engages coil 0 to spark the corresponding spark plug. A complication results though when the coil charging time extends greater than 90°. As seen in FIG. 9, the coil 0 initial charging time is at 110° BTDC. This causes an initial saturation problem in that the coil 0 cannot be properly charged. This is partially solved by having all four coils initially charged in the first cycle. However, for timing reasons an initial saturated coil 144 must be chosen to permit the full 110° coil charge time. FIG. 10 is a table look up which selects which coil. As seen in FIG. 10, at 110° BTDC coil 1 is the first initial saturated coil 144 to have the entire 110° charge value. Had the charge time dropped to 80°, coil 0 would have been the first to be initially charged; and had it extended to 180° coil 2 would have been the first to initially charge. The FIG. 10 values are for distributorless engines but had there been the use of a distributor the value would always be 0 thus not being considered by the microcontroller. The initial saturated cylinder 144 is in essence the initial programmed coil turned on after the TDC slot 38.

The initial sat tables as seen in FIGS. 11 and 12 calculate the degrees after the TDC slot 38. As seen in FIG. 12 at 110° BTDC on the Y axis of the ignition development system corresponds to 61 counts after TDC slot 38. As such, 61 is added to an 8° reset cycle of the microcontroller plus a 1° margin of error to equal 70 counts after TDC. Converting this to terms of BTDC by subtracting 70 from 90 equals 20. The initial sat 144 is thus 20° before top dead center of coil 0 and 110° before top dead center of coil 1.

Some processing must occur once the table values for a given RPM/sensor state are loaded at the trailing edge of TDC of cylinder 1, i.e. the TDC of the rotor inner track at slot 38. It would not be possible to allow for a spark or coil saturation event at this time since the processor is necessarily dealing with table loading, value initialization, determination of sensor state, etc. In high engine RPM this can be a problem. It is assumed that no spark can occur within the area of the rotor immediately after TDC of the inner track slot because the maximum amount of advance allowed is 75° BTDC center as limited in software and there is a total of 90° minimum cylinder boundary area available on an eight cylinder engine. Therefore, coil saturation events occur at fixed 100 intervals.

The tables are especially valuable as slot width and aperture width effect when the values in the table start to count down. The slot width and aperture width effect signal integrity at high speeds and tables permit a method of zeroing in the ignition without changing the source code of a computer program.

Once the initial spark is calculated, the microcontroller calculates the second spark location 148 by taking the first spark value on the graph, subtracting the second spark graph value and a spark duration assumed to be 2°. The third spark location 150 is calculated by taking the second spark value on the graph and subtracting the third spark on the graph value and a spark duration of an assumed 2°.

The interval sat is the interval in degrees between coil saturations for one cylinder, two cylinder and Harley-Davidson® motorcycles, this is 255°, for three cylinder engines this is 120°; for four cylinders this is 180°; for six cylinders this is 120°; and for eight cylinders this is 90°.

The interval spark 152 for one spark per cylinder equals the interval sat, for two sparks per cylinder the interval spark 152 equals the interval sat minus the second spark minus the spark duration (assumed to be 2°), and for three sparks the interval spark is equal to the interval sat minus the second spark and duration (assumed to be 2°) minus the third spark and duration (assumed to be 2°). Therefore, the interval spark is a value corresponding to the number of degrees between the last spark 150 and not a specific point on the rotor. The interval spark is repeated until the a TDC signal is produced.

The ignition coils 50 follow at steady state until a change in engine RPM transitions past a different node. At such a time all coils 50 are again charged and the curve is adjusted for a new set of variables at TDC slot 38.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. An engine control system for an internal combustion engine having one or more cylinders, a piston mounted within each cylinder for reciprocating movement to a plurality of degree positions therein, a shaft connected to the piston for rotation in response to reciprocating movement of the piston creating a plurality of compression cycles, the system comprising:
   a sensor for sensing a piston top dead center position and generating a first position signal and a second count signals in response to movement of the piston;
   a user programmable intelligent controller connected to the sensor for calculating a piston position and an engine RPM based upon the position signal and the count signal;
   a programming input connector electrically connected to the intelligent controller to allow a user to program the intelligent controller through a user interface; and
   an engine controlling output created by the intelligent controller in response to at least one of the piston positions or the engine RPM.

2. The system of claim 1 wherein the sensor has a rotor with a plurality of circumrerential slots to produce the count signals.

3. The system of claim 2 wherein the slots are spaced representing degree increments.

4. The system of claim 3 wherein the intelligent controller calculates the piston position by determining the piston top dead center, adding the count signals, and multiplying the total counting signals by the degree increments.

5. The system of claim 4 wherein the intelligent controller further calculates the piston position between count signals by generating time delays based on the engine RPM.

6. The system of claim 2 wherein the sensor is an optical sensor.

7. The system of claim 2 wherein the sensor is a magnetic pickup.

8. The system of claim 2 wherein the sensor has a rotor with a top dead center slot passing through the sensor to produce the first signal.

9. The system of claim 8 wherein the top dead center slot is adjacent the counting slots.

10. The system of claim 9 wherein the sensor has a pickup with two track sides, one track side for a first circumference having the counting slots and the second track side for a second circumference having the top dead center slot.

11. The system of claim 8 wherein the sensor has an indicator light illuminated during the position signal.

12. The system of claim 1 wherein the sensor is housed within a sealed enclosure adapted for dirty environments.

13. The system of claim 1 wherein the sensor has a mount plate adapted for attachment to a rotating plate.

14. The system of claim 1 wherein the intelligent controller produces the engine controlling output after comparison to programmed parameters stored in memory.

15. A method of programming a user programmable engine control system for an internal combustion engine having a cylinder, a piston mounted within the cylinder for reciprocating movement to a plurality of degree positions therein, a cam shaft and a crankshaft connected to the piston for rotation in response to reciprocating movement of the piston creating a plurality of compression cycles, an intelligent controller connected to an engine output device for controlling operation of the engine, the method comprising:
   connecting the intelligent controller to a user interface;
   determining engine parameters;
   inputting engine parameters into the user interface; and
   downloading parameters from the user interface to the intelligent controller.

16. The method of claim 15 wherein the step of determining engine parameters includes an engine cycle selection step.

17. The method of claim 15 wherein the step of determining engine parameters includes a spark distribution selection step.

18. The method of claim 15 wherein the step of determining engine parameters includes a rotation sensing system mounting selection step.

19. The method of claim 15 wherein the step of determining engine parameters includes a number of engine cylinder selection step.

20. The method of claim 15 further comprising the step of selecting the number of sparks to be utilized for the cylinder during each compression cycle.

21. The method of claim 20 further comprising the step of selecting an RPM lag value.

22. The method of claim 15 further comprising the step of selecting a number of sensors impacting the firing time of the sparks.

23. The method of claim 22 further comprising the step of selecting a sensor state.

24. The method of claim 15 further comprising the step of adjusting a coil charging value.

25. The method of claim 15 further comprising the step of setting a revolutions per minute limit for the engine.

26. The method of claim 15 further comprising the step of selecting a switch dependent upon the engine RPM.

27. The method of claim 15 further comprising the step of selecting a tachometer condition adapted to correctly display engine revolutions per minute independent of a tachometer's original pulse input configuration.

28. A method of programming an engine control system for an internal combustion engine having one or more cylinders, a piston mounted within each cylinder for reciprocating movement to a plurality of degree positions therein, a shaft connected to the piston for rotation in response to reciprocating movement of the piston creating a plurality of compression cycles, the method comprising:

providing an engine control system having a sensor adjacent the shaft for creating piston top dead center signals and count signals in response to rotational movement of the shaft and a user programmable intelligent controller connected to the sensor for calculating a piston position and an engine RPM based upon the piston top dead center signals and the count signals;

receiving engine parameters from a user interface into the intelligent controller; and calculating engine controlling output in response to at least one of the piston positions or the engine RPM.

29. The method of claim 28 further comprising the step of selecting a switch dependent upon the engine RPM.

30. The method of claim 28 wherein receiving engine parameters includes at least one of an engine cycle selection step, a spark distribution selection step, a rotation sensing system mounting selection step, or a number of engine cylinder selection step.

31. The method of claim 28 further comprising the step of selecting the number of transition for the engine controlling output.

32. The method of claim 28 further comprising the steps of selecting an RPM lag value.

33. The method of claim 32 further comprising the step of selecting a number of sensors influencing the engine controlling output.

34. The method of claim 33 further comprising the step of selecting a sensor state.

35. The method of claim 28 further comprising the step of selecting a tachometer condition adapted to correctly display engine revolutions per minute independent of a tachometer's original pulse input configuration.

* * * * *